US011977785B2

(12) United States Patent
Lee et al.

(10) Patent No.: US 11,977,785 B2
(45) Date of Patent: May 7, 2024

(54) NON-VOLATILE MEMORY DEVICE-ASSISTED LIVE MIGRATION OF VIRTUAL MACHINE DATA

(71) Applicant: MICROSOFT TECHNOLOGY LICENSING, LLC, Redmond, WA (US)

(72) Inventors: Scott Chao-Chueh Lee, Bellevue, WA (US); Lei Kou, Redmond, WA (US); Monish Shantilal Shah, Sammamish, WA (US); Liang Yang, Redmond, WA (US); Yimin Deng, Redmond, WA (US); Martijn De Kort, Mill Creek, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/667,513

(22) Filed: Feb. 8, 2022

(65) Prior Publication Data

US 2023/0251799 A1 Aug. 10, 2023

(51) Int. Cl.
*G06F 12/00* (2006.01)
*G06F 3/06* (2006.01)
*G06F 9/455* (2018.01)

(52) U.S. Cl.
CPC .......... *G06F 3/0664* (2013.01); *G06F 3/0604* (2013.01); *G06F 3/0647* (2013.01);
(Continued)

(58) Field of Classification Search
CPC .... G06F 3/0664; G06F 3/0604; G06F 3/0647; G06F 3/0659; G06F 3/067; G06F 9/45558; G06F 2009/4557
See application file for complete search history.

(56) References Cited

U.S. PATENT DOCUMENTS 10,969,973 B2    4/2021  De Kort et al.
2013/0198312 A1  8/2013  Elizer Tamir et al.
(Continued)

FOREIGN PATENT DOCUMENTS

CN    109634771 A    4/2019
EP    3926471 A1    12/2021

OTHER PUBLICATIONS

"Solid State Storage", In Advancing Storage and Information Technology, Oct. 1, 2020, 101 Pages.
(Continued)

*Primary Examiner* — John A Lane
(74) *Attorney, Agent, or Firm* — Newport IP, LLC; Jacob P. Rohwer

(57) ABSTRACT

The disclosed technologies provide functionality for non-volatile memory device-assisted live migration of virtual machine ("VM") data. A host computing device (the "host") requests that a source non-volatile memory device track changes to a namespace by a VM. In response thereto, the source device tracks changes made by the VM to the namespace and stores one or more data structures that identify the changed portions of the namespace. The host requests the data structures from the source device and requests the contents of the changed portions from the source device. The host then causes the data changed by the VM in the namespace to be written to a namespace on a target non-volatile memory device. The host can also retrieve the device internal state of a child physical function on the source device. The host migrates the retrieved device internal state to a child physical function on the target device.

18 Claims, 14 Drawing Sheets

(52) U.S. Cl.
CPC ............ *G06F 3/0659* (2013.01); *G06F 3/067* (2013.01); *G06F 9/45558* (2013.01); *G06F 2009/4557* (2013.01)

(56) References Cited

U.S. PATENT DOCUMENTS

| | | | |
|---|---|---|---|
| 2013/0332660 | A1 | 12/2013 | Talagala et al. |
| 2020/0174819 | A1 | 6/2020 | Dong et al. |
| 2020/0333975 | A1 | 10/2020 | Benisty |
| 2021/0132860 | A1 | 5/2021 | Kou et al. |
| 2021/0263762 | A1* | 8/2021 | Kachare ............... G06F 12/0868 |
| 2022/0004503 | A1* | 1/2022 | Mukherjee ........... G06F 12/1009 |
| 2022/0129181 | A1* | 4/2022 | Morabad ............... G06F 3/0647 |

OTHER PUBLICATIONS

"TCG Storage Architecture Core Specification", https://trustedcomputinggroup.org/wp-content/uploads/TCG_Storage_Architecture_Core_Spec_v2.01_r1.00.pdf, Aug. 5, 2015, 306 Pages.

"TCG Storage Feature Set: Block SID Authentication", Retrieved from: https://trustedcomputinggroup.org/wp-content/uploads/TCG_Storage-Feature_Set_Block_SID_Authentication_1-00_1-00.pdf, Aug. 5, 2015, 12 Pages.

"TCG Storage Interface Interactions Specification (SIIS)", Retrieved from: https://trustedcomputinggroup.org/wp-content/uploads/TCG_SWG_SIIS_v1.08_r1.00.pdf, Oct. 26, 2018, 58 Pages.

"TCG Storage Opal SSC Feature Set: Additional DataStore Tables", Retrieved from: https://web.archive.org/web/20210126214916/https://trustedcomputinggroup.org/resource/tcg-storage-opal-ssc-feature-set-additional-datastore-tables/, Jan. 26, 2021, 5 Pages.

"TCG Storage Opal SSC Feature Set: Configurable Namespace Locking", Retrieved from: https://trustedcomputinggroup.org/wp-content/uploads/TCG_Storage-Opal_Feature_Set_CNL_v1_00_r1_00_pub.pdf, Feb. 22, 2019, 41 Pages.

"TCG Storage Opal SSC Feature Set: PSID", Retrieved from: https://trustedcomputinggroup.org/wp-content/uploads/TCG_Storage-Opal_Feature_Set_PSID_v1.00_r1.00.pdf, Aug. 5, 2015, 13 Pages.

"TCG Storage Opal SSC Feature Set: Single User Mode", Retrieved from: https://trustedcomputinggroup.org/wp-content/uploads/TCG_Storage-Opal_Feature_Set_Single_User_Mode_v1.00_r2.00.pdf, Aug. 5, 2015, 33 Pages.

"TCG Storage Protection Mechanisms for Secrets", Retrieved from: https://trustedcomputinggroup.org/wp-content/uploads/TCG_Storage_Protection_Mechanisms_for_Secrets_1-00_1-00_FINAL.pdf, Mar. 5, 2012, 7 Pages.

"TCG Storage Security Subsystem Class: Opal", Retrieved from: https://trustedcomputinggroup.org/wp-content/uploads/TCG_Storage-Opal_SSC_v2.01_rev1.00.pdf, Aug. 5, 2015, 80 Pages.

"TCG Storage Opal SSC Feature Set: Configurable Locking for NVMe Namespaces and SCSI LUNs", Retrieved from: https://trustedcomputinggroup.org/wp-content/uploads/TCG_Storage_Configurable_Namespace_Locking-NS_and_LUN_v1p01_r1p11_31mar2021.pdf, Jan. 25, 2021, 50 Pages.

"International Search Report and Written Opinion Issued in PCT Application No. PCT/US22/050009", dated Feb. 13, 2023, 12 Pages.

"NVM Express NVM Command Set Specification", Retrieved from https://nvmexpress.org/wp-content/uploads/NVMe-NVM-Command-Set-Specification-1.0a-2021.07.26-Ratified.pdf, Jul. 23, 2021, pp. 1-105.

International Search Report and Written Opinion received for PCT Application No. PCT/US2023/036824, Mar. 1, 2024, 2024, 14 pages.

U.S. Appl. No. 18/601,692, filed Mar. 11, 2024.

* cited by examiner

NON-VOLATILE MEMORY DEVICE-ASSISTED LIVE MIGRATION OF VIRTUAL MACHINE DATA

BACKGROUND

A data center is a facility that houses computer systems and various networking, storage, and other related components. Data centers may, for example, provide computing services to businesses and individuals as a remote computing service or provide "software as a service" (e.g., cloud computing).

To facilitate efficient utilization of data center resources, virtualization technologies allow a physical computing device to host one or more virtual machines ("VMs") that appear to operate as physical computing devices. Data centers can typically create, maintain, and delete VMs in a dynamic manner.

Live migration is a mechanism used to move the state of a running VM (e.g., memory, storage, and networking) from one host computing device to another host computing device in a manner that minimizes the downtime of the VM. Live migration is used in many scenarios, including disruptive firmware update, cluster defragmentation, host or network hardware updates, load balancing, and others to minimize VM downtime.

VMs commonly utilize Virtual Hard Disks ("VHDs") for mass data storage. VHDs may contain what is typically found on a physical mass storage device, such as disk partitions and a file system which, in turn, can contain files and folders. Because VHDs are files, VHDs can be easily moved between physical hosts during live migration.

Live migration of VM data can, however, be much more difficult when VHDs are not utilized. For example, some non-volatile memory devices can be configured in a manner that enables VMs to directly access a physical portion of the available non-volatile storage space provided by the device. While this configuration can provide many benefits, such as highly performant access to storage, previous solutions for live migration of VHDs will not function in these configurations.

It is with respect to these and other technical challenges that the disclosure made herein is presented.

SUMMARY

Technologies are disclosed herein for non-volatile memory devices-assisted live migration of VM data. Through implementations of the disclosed technologies, a non-volatile memory device can be configured with functionality for enabling the process of live migration of data written by VMs directly to non-volatile memory on the device. This functionality can be implemented in a manner that minimizes the performance impact on the device. Other technical benefits not specifically mentioned herein can also be realized through implementations of the disclosed subject matter.

As discussed briefly above and in further detail below, the disclosed technologies include functionality for non-volatile memory device-assisted live migration of VM data. In one embodiment, the non-volatile memory device is a single physical function non-volatile memory device ("SFND"). In other embodiments, the non-volatile memory device is a multiple physical function non-volatile memory device ("MFND"). In this regard, it is to be appreciated that while the embodiments described below are primarily presented in the context of an MFND, the disclosed embodiments can also be utilized with a SFND and, potentially, other types of non-volatile memory devices.

In order to provide this functionality, a non-volatile memory device is configured to implement commands for enabling live migration of data written to non-volatile memory on the non-volatile memory device directly by a VM. As one example, a non-volatile memory device can be configured to implement a command for tracking changes made to a namespace on a non-volatile memory of the non-volatile memory device by an associated VM. In response to receiving a request to perform this command, the non-volatile memory device can begin tracking changes to the namespace made by the VM in one or more data structures.

In various embodiments, the one or more data structures might be implemented as a bitmap of mapped pages. The bitmap of mapped pages is a bitmap that identifies mapped pages from a namespace assigned to a VM. Mapped pages are pages that have been allocated due to write or write zeroes commands, such as those defined by the Non-Volatile Memory Express ("NVMe") Specification.

The one or more data structures might also include a bitmap of dirty pages, which is a bitmap identifying dirty pages in a namespace assigned to a VM. Dirty pages are pages that have been modified due to write or write zeroes commands, such as those defined by the NVMe Specification. The size of the page mapping to single bits in the bitmap of mapped pages and the bitmap of dirty pages can be reported by the MFND to a host computing device.

A non-volatile memory device can also be configured to implement a command for providing the one or more data structures that identify the changes to a namespace made by a VM to a host computing device. In response to receiving a request to perform such a command, the non-volatile memory device returns the one or more data structures such as, but not limited to, the bitmap of mapped pages and the bitmap of dirty pages described above. The host computing device can utilize the one or more data structures to identify the data that the VM changed in the namespace and to retrieve that data from the non-volatile memory device. The host computing device can then migrate the retrieved data to a namespace on a second non-volatile memory device, which might be referred to herein as a "target" non-volatile memory device.

A non-volatile memory device can also be configured to implement a command for enabling a host computing device to retrieve a device internal state of the child physical function on the non-volatile memory device that is assigned to the VM. In response to a request to perform such a command, the non-volatile memory device can retrieve the device internal state from the child physical function and provide the device internal state to the host computing device. A non-volatile memory device can also be configured to implement a command for restoring a device internal state to a child physical function, such as on a target non-volatile memory device.

In some embodiments the requests to perform the commands described above are received from a host computing device at a parent physical function of an non-volatile memory device. In other embodiments, such as embodiments wherein one or more non-volatile memory device are shared between several or more host computing devices, the requests to perform the commands described above are received at a child physical function of the non-volatile memory device that has been designated as a migration controller.

In order to perform live migration of VM data stored in a namespace on a non-volatile memory device, which might be referred to herein as a "source" non-volatile memory device, a host computing device first requests that the source non-volatile memory device track changes to the namespace by the associated VM using the command described above. In response thereto, the source non-volatile memory device tracks changes made by the VM to the namespace and stores one or more data structures such as those described above that identify the changed portions of the namespace.

In turn, the host computing device requests the one or more data structures from the source non-volatile memory device. The host computing device then utilizes the one or more data structures to identify the modified portions of the namespace and requests the contents of those changed portions from the source MFND. The source non-volatile memory device, in turn, provides the changed data to the host computing device. The host computing device then causes the data changed by the VM in the namespace to be written to a namespace on a target non-volatile memory device. This process may be repeated until all of the changed data has been migrated from the namespace on the source non-volatile memory device to the namespace on the target non-volatile memory device.

The host computing device can also utilize the command described above for retrieving the device internal state of a child physical function on the source non-volatile memory device that is assigned to the VM to be migrated. The host computing device receives the device internal state from the source non-volatile memory device in response thereto and causes the device internal state to be restored to a child physical function on the target non-volatile memory device. Once the namespace and the device internal state have been migrated to the target non-volatile memory device, the VM may be resumed on the host computing device of the target non-volatile memory device.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
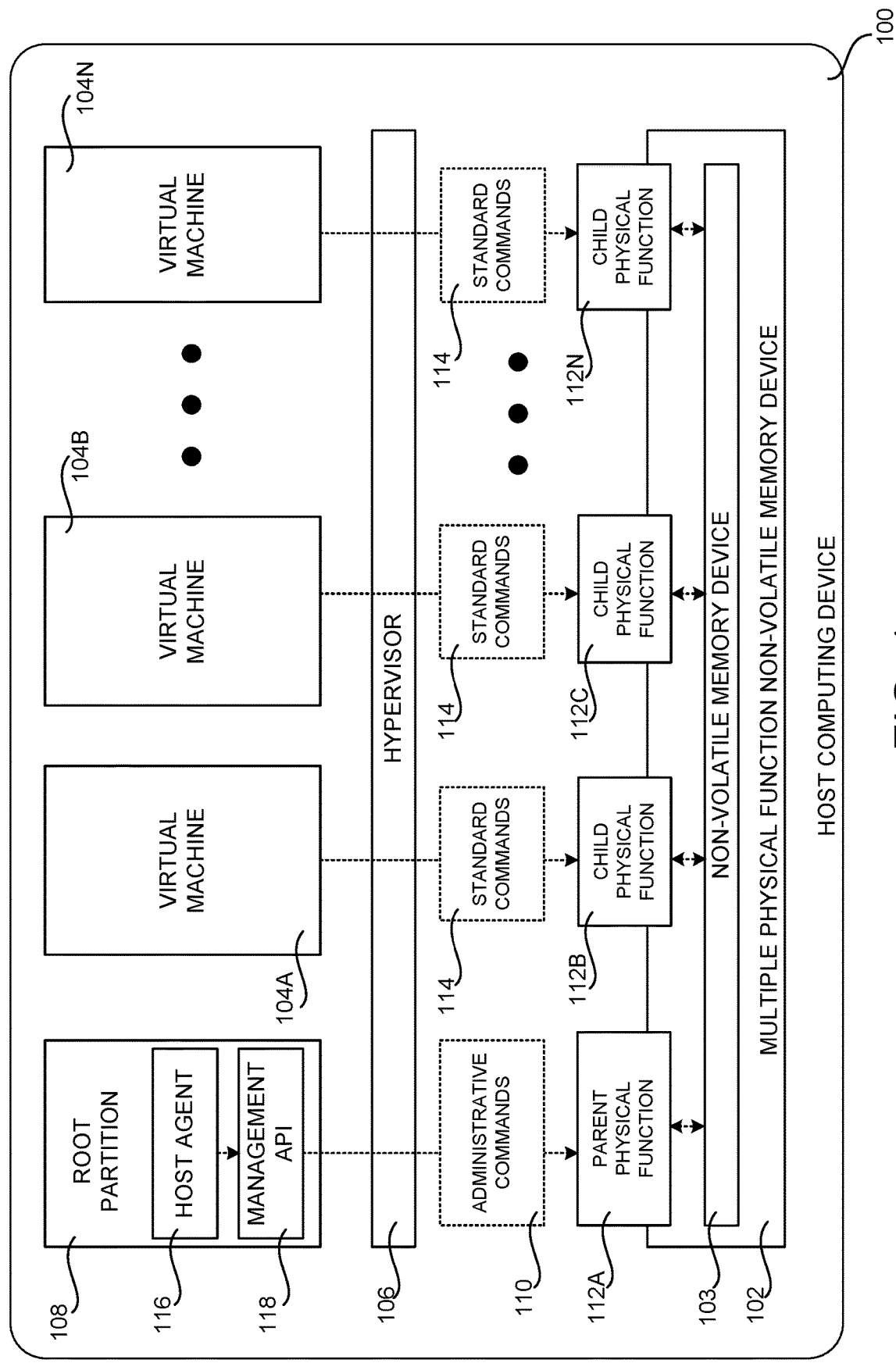
FIG. 1 is a computing architecture diagram that shows aspects of the configuration and operation of a MFND that can implement the embodiments disclosed herein, according to one embodiment.

The following detailed description is directed to technologies for non-volatile memory device-assisted live migration of VM data. As discussed briefly above, non-volatile memory devices implementing the disclosed technologies can be configured with functionality for enabling aspects of the process of live migration of data written by VMs directly to non-volatile memory. This functionality can be implemented in a manner that minimizes the performance impact on the non-volatile memory device. The functionality provided by the non-volatile memory devices disclosed herein can also be utilized to enable workflows other than live migration. Other technical benefits not specifically mentioned herein can also be realized through implementations of the disclosed subject matter.

While the subject matter described herein is presented in the general context of NVMe single and multiple physical function non-volatile memory devices, those skilled in the art will recognize that the technologies disclosed herein can be used with other types of single and multiple physical function devices, including other types of single multiple physical function non-volatile memory devices. In this regard, it is to be further appreciated that while the embodiments described below are primarily presented in the context of an MFND, the disclosed embodiments can also be utilized with a SFND and, potentially, other types of non-volatile memory devices.

Those skilled in the art will also appreciate that the subject matter described herein can be practiced with various computer system configurations, including host computers in a distributed computing environment, hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for non-volatile memory device-assisted live migration of VM data will be described.

FIG. 1 is a computing architecture diagram that shows aspects of the configuration and operation of a non-volatile memory device, an MFND 102 in the illustrated embodiment, that can implement the embodiments disclosed herein, according to one embodiment. As discussed briefly above, an MFND 102 is an NVMe Specification-compliant non-volatile memory device in some embodiments. The MFND 102 can be hosted by a host computing device 100 (which might be referred to herein simply as a "host"), such as a server computer operating in a distributed computing network such as that described below with reference to FIG. 6.

As also discussed briefly above, NVMe is an open logical device interface specification for accessing non-volatile storage media. In some embodiments, an NVMe device is accessible via a PCIe bus. In other embodiments, an NVMe device is accessible via a network or other packet-based interface.

The NVMe Specification defines a register interface, command set, and collection of features for PCIe-based solid-state storage devices ("SSDs") with the goals of high performance and interoperability across a broad range of non-volatile memory subsystems. The NVMe Specification does not stipulate the ultimate usage model, such as solid-state storage, main memory, cache memory or backup memory.

NVMe provides an alternative to the Small Computer System Interface ("SCSI") standard and the Advanced Technology Attachment ("ATA") standard for connecting and transmitting data between a host computing device 100 and a peripheral target storage device. The ATA command set in use with Serial ATA ("SATA") SSDs and the SCSI command set for Serial Attached SCSI ("SAS") SSDs were developed at a time when hard disk drives ("HDDs") and tape were the primary storage media. NVMe was designed for use with faster media. The main benefits of NVMe-based PCIe SSDs over SAS-based and SATA-based SSDs are reduced latency in the host software stack, higher IOPS and potentially lower power consumption, depending on the form factor and the number of PCIe lanes in use.

NVMe can support SSDs that use different types of non-volatile memory, including NAND flash and the 3D XPOINT technology developed by INTEL and MICRON TECHNOLOGY. Supported form factors include add-in PCIe cards, M.2 SSDs and U.2 2.5-inch SSDs. NVMe reference drivers are available for a variety of operating systems, including the WINDOWS and LINUX operating systems. Accordingly, it is to be appreciated that the MFND 102 described herein is not limited to a particular type of non-volatile memory, form factor, or operating system.

The MFND 102 described herein includes capabilities for exposing multiple physical functions (which might be referred to herein as "PFs") 112A-112N to the host computing device 100. As discussed above, it is to be appreciated that the functionality disclosed herein as being provided by the MFND 102 can also be provided by an SFND in other embodiments. An SFND exposes only a single physical function to a host computing device 100.

Each of the PFs 112A-112N exposed by the MFND 102 is an independent NVMe controller in one embodiment. The PFs 112A-112N are other types of controllers in other embodiments. At least a plurality of PF 112A-112N are independent NVMe controllers and at least one distinct PF 112A-112N is a non-NVME controller in other embodiments.

One PF 112A in the MFND 102, which might be referred to herein as the "parent PF 112A" or the "parent controller 112A," acts as a parent controller. In one embodiment, for instance, the parent PF 112A is the privileged PCIe function zero of the MFND 102. In this regard, it is to be appreciated that the parent controller might be configured as another PCIe function number in other embodiments. The parent PF 112A and child PFs described below might also be device types other than NVMe devices in some embodiments.

The parent PF 112A can act as a parent controller to receive and execute administrative commands 110 generated by a root partition 108. In particular, the parent PF 112A can manage child PFs 112B-112N such as, for example, by creating, deleting, modifying, and querying the child PFs 112B-112N. The child PFs 112B-112N might be referred to herein interchangeably as "child PFs 112B-112N" or "child physical functions 112B-112N."

The child PFs 112B-112N are regular PCIe physical functions of the MFND device 102. The child PFs 112B-112N can behave like regular and independent NVMe controllers. The child PFs 112B-112N can also support the administrative and I/O commands defined by the NVMe Specification.

Through the use of the multiple PFs 112A-112N exposed by the MFND 102, I/O resources provided by the MFND 102 can be efficiently shared between VMs 104A-104N. For instance, child PFs 112B-112N can be directly assigned to different VMs 104A-104N, respectively, through various direct hardware access technologies such as HYPER-V NVMe Direct or DDA. In this way, the child PFs 112B-112N exposed by a single MFND 102 can appear as multiple, separate physical devices to individual VMs 104A-104N, respectively. This allows individual VMs 104A-104N to directly utilize a respective portion of the available storage space provided by a non-volatile memory device 103 on the MFND 102 with reduced CPU and hypervisor 106 overhead.

In some configurations, the host computing device 100 operates in a distributed computing network, such as that described below with regard to FIG. 6. Additionally, the host computing device 100 executes a host agent 116 and a management application programming interface ("API") 118 in order to enable access to aspects of the functionality disclosed herein in some embodiments.

The host agent 116 can receive commands from other components, such as other components in a distributed computing network such as that described below with regard to FIG. 6, and make calls to the management API 118 to implement the commands. In particular, the management API 118 can issue administrative commands to the parent PF 112A to perform the various functions described herein. Details regarding various methods exposed by the management API 118 to the host agent 116 for implementing the functionality disclosed herein are described below.

In some embodiments, the MFND 102 has two modes of operation: regular user mode and super administrator mode. In regular user mode, only read-only functions can be executed. The non-read-only management functions described herein (e.g., set the QoS level for a PF, etc.) must be executed in the super administrator mode. If an attempt is made to execute these functions in regular user mode, an error (which might be referred to herein as an "ERROR_ACCESS_DENIED" error) will be returned. The API 118 exposes methods for getting the device operation mode (which might be referred to herein as the "GetDeviceOperationMode" method) and switching the device operation mode (which might be referred to herein as the "SwitchDeviceOperationMode" method) in some embodiments.

As discussed briefly above, previous solutions for live migration of virtualized storage, such as VHDs, will not function when a MFND 102 is utilized in the manner described above. The technologies presented herein address these and potentially other technical considerations by enabling MFND-assisted live migration of VM data. Additional details regarding these aspects will be provided below.

Figure 2A:
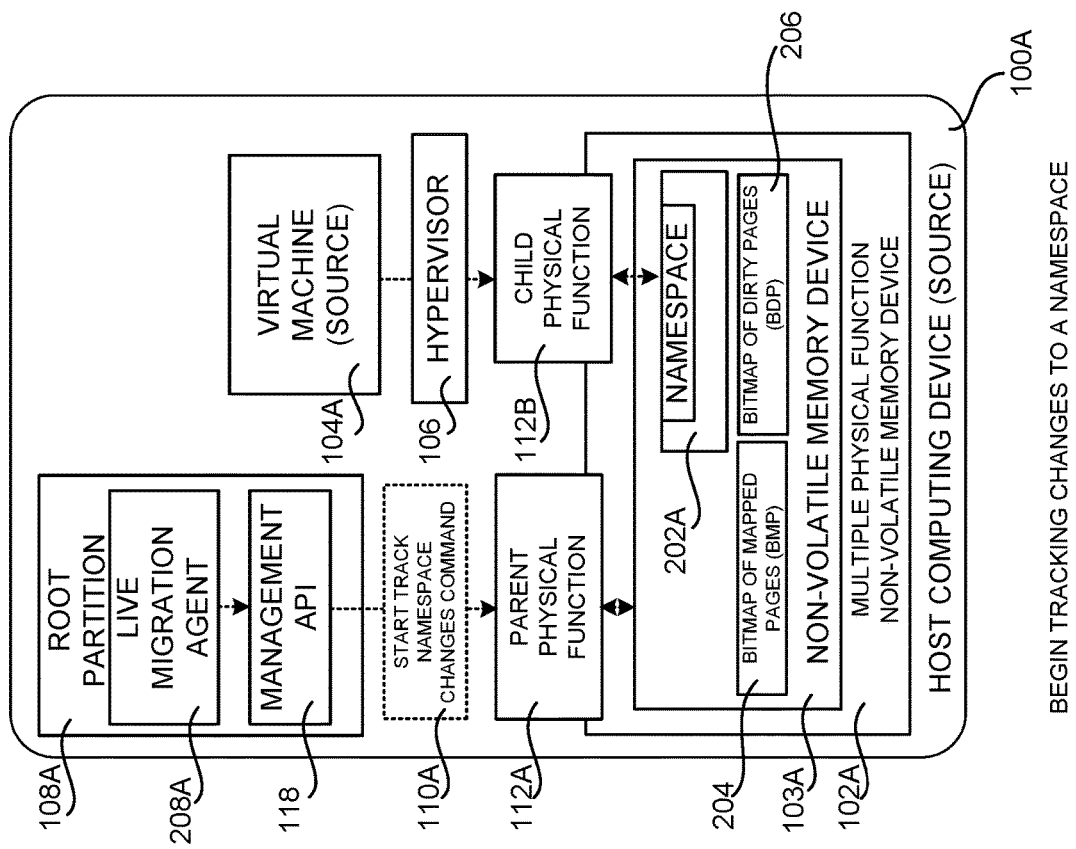
FIG. 2A is a computing architecture diagram showing aspects of one mechanism disclosed herein for tracking changes made to a namespace by a source VM, according to one embodiment.

FIGS. 2A-2G are computing architecture diagrams showing aspects of one mechanism disclosed herein for non-volatile memory device-assisted live migration of VM data. As shown in FIG. 2A and described briefly above, in one embodiment a host computing device 100A (which might be referred to herein as the "host 100A," the "source device 100A," or the "source host computing device 100A") acts as a host for an MFND 102A (which might be referred to herein as the "source MFND 102A"). A VM 104A (which might be referred to herein as the "source VM 104A") executes on the source computing device 100A by way of the hypervisor 106.

As discussed above, a child physical function 112B on the source MFND 102A may be associated with the VM 104A in the manner described above, whereby the VM 104A can directly utilize a portion of the non-volatile memory device 103A of the source MFND 102A. The portion of the non-volatile memory device 103A associated with the VM 104A might be referred to herein as the "namespace 202A" or the "source namespace 202A."

As described briefly above, the MFND 102A provides functionality for assisting with live migration of VM data, such as data stored by the VM 104A in the namespace 202A. For example, and as illustrated in FIG. 2C, the contents of the namespace 202A may be migrated to a namespace 202B (which might be referred to herein as the "target namespace 202B") on a MFND 102B (which might be referred to herein as the "target MFND 102B") on a host computing device 100B (which might be referred to as the "target host 100B," the "target device 100B," or the "target host computing device 100B").

In order to provide this functionality, the MFND 102A and the MFND 102B are configured to implement commands for enabling live migration of data written to a non-volatile memory device directly by a VM. As one example, a MFND 102A can be configured to implement a command 110A for tracking changes to a namespace 202A on a non-volatile memory device 103A of the MFND 102A by an associated VM 104A. The MFND 102A can also implement a command to stop the tracking of changes to the namespace 202A.

As shown in FIG. 2A, the command 110A might be initiated by a live migration agent 208A executing on the root partition 108A. The live migration agent 208A provides the functionality described below for assisting with the process of live migration of a VM 104A and its associated data. In response to a call to the management API 118 from the live migration agent 208A, the management API 118 issues the command 110A to the parent physical function 112A of the MFND 102A in some embodiments. In other embodiments, such as that described below with respect to FIG. 4, the command 110A is issued to a child PF on the MFND 102A that has been designated as a migration controller.

In response to receiving a request to perform the command 110A, the MFND 102A can track changes to the namespace 202A made by the VM 104A in one or more data structures. Tracking changes to the namespace 202A made by the VM 104A on the MFND 102A enables identification of those changes made by a VM 104A that has been directly assigned to a namespace 104A on the MFND 102A, which was not technically possible with previous solutions.

In various embodiments, the one or more data structures might be implemented as a bitmap of mapped pages ("BMP") 204. The BMP 204 is a bitmap that identifies mapped pages from a namespace 202A assigned to a VM 104A. Mapped pages are pages that have been allocated due to write or write zeroes commands, such as those defined by the NVMe Specification.

The one or more data structures might also include a bitmap of dirty pages ("BDP") 206, which is a bitmap identifying dirty pages in a namespace 202A assigned to a VM 104A. Dirty pages are pages that have been modified due to write or write zeroes commands, such as those defined by the NVMe Specification. The size of the page mapping to single bits in the BMP 204 and the BDP 206 can be reported by the MFND 102A to the source host computing device 100A. For example, and without limitation, each individual bit in the BMP 204 and the BDP 206 might map to respective 4 kilobytes ("kB"), 8 kB, 16 kB, 32 kB, or 64 kB of the namespace 202A.

It is to be appreciated that other types and configurations of data structures might be utilized in other embodiments to track changes to the namespace 202A such as, but not limited to, an ordered list of mapped page ranges and an ordered list of dirty page ranges.

Figure 2B:
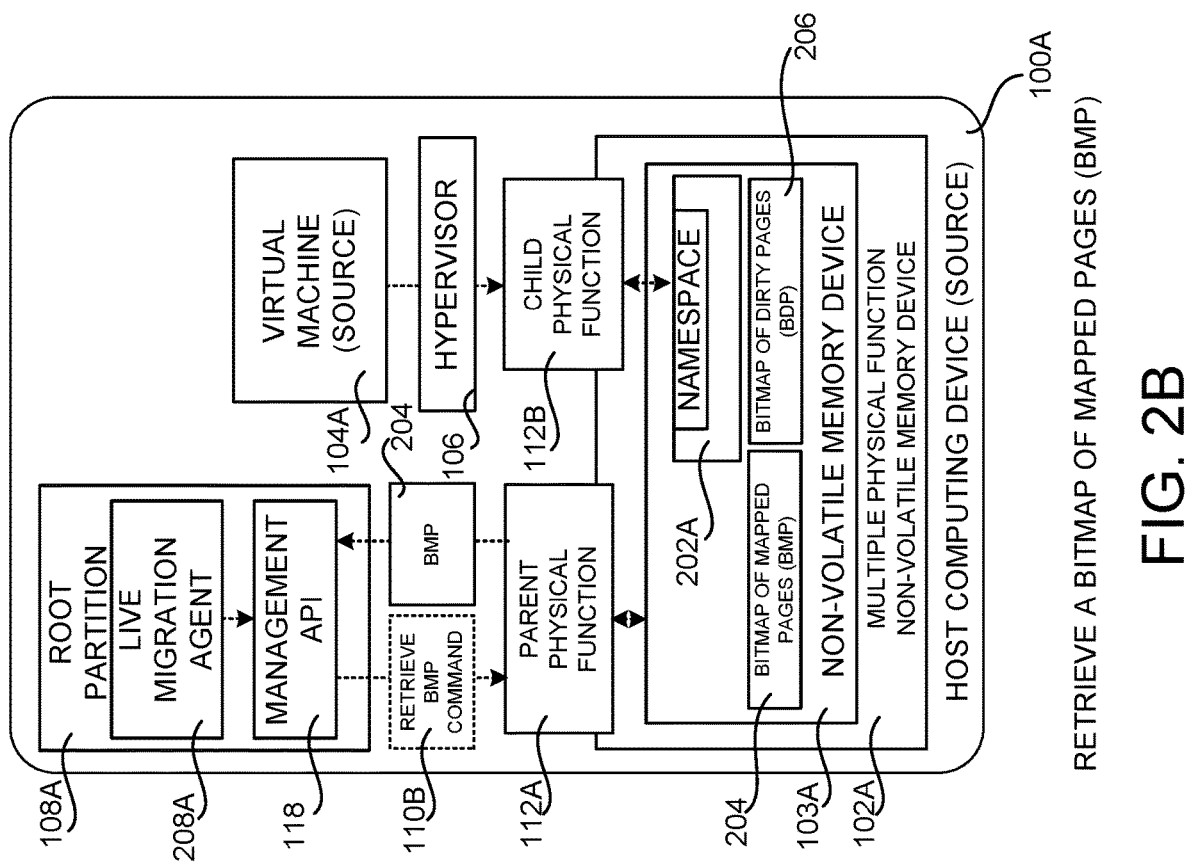
FIG. 2B is a computing architecture diagram showing aspects of one mechanism disclosed herein for retrieving a bitmap of mapped pages from a MFND, according to one embodiment.
Figure 2C:
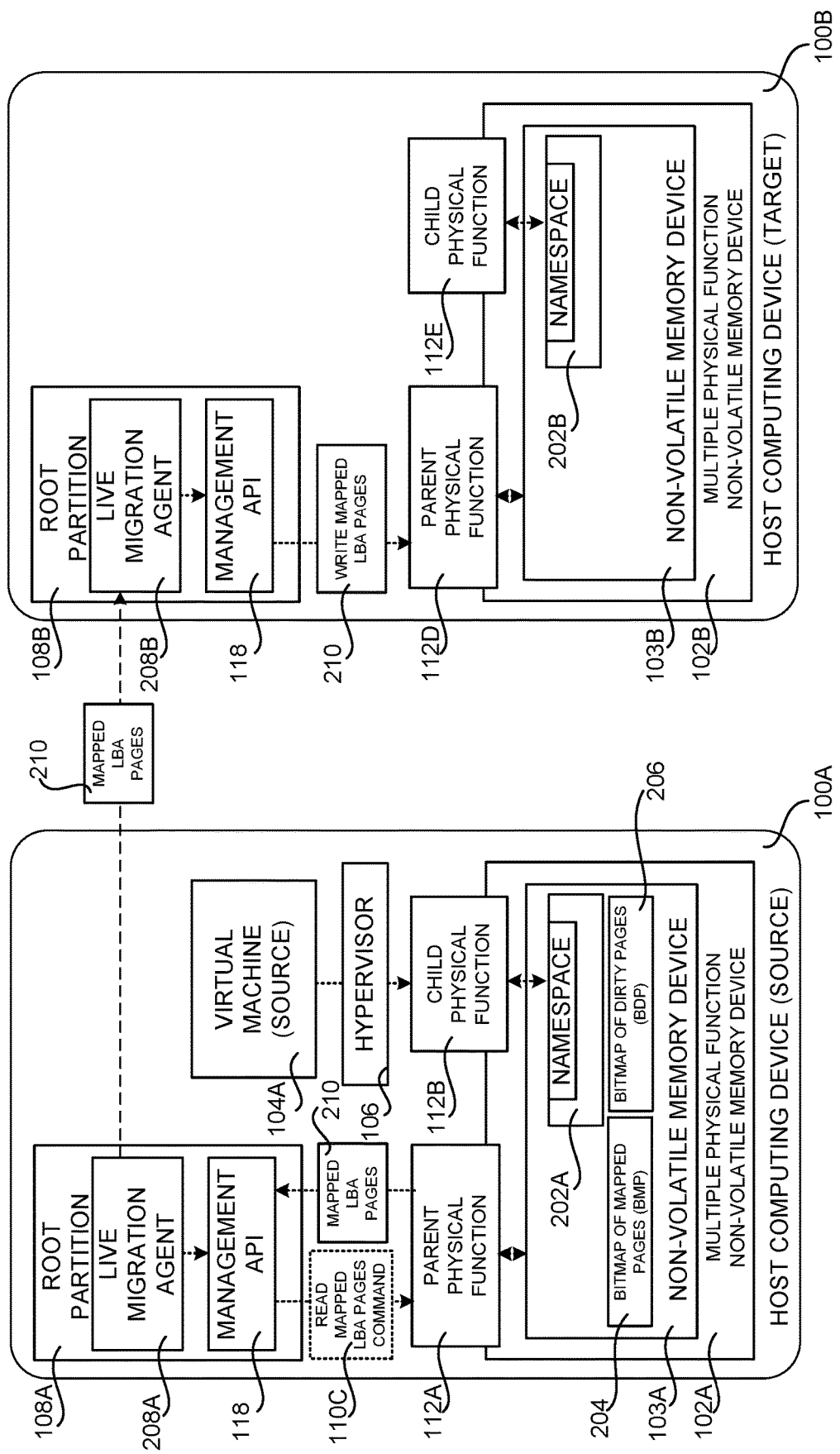
FIG. 2C is a computing architecture diagram showing aspects of one mechanism disclosed herein for reading mapped pages from a source namespace and writing the mapped pages to a namespace provided by a target child physical function of a MFND, according to one embodiment.

As shown in FIG. 2B, the MFND 102A can also be configured to implement commands for providing the one or more data structures that identify the changes to the namespace 202A made by the VM 104A to the source host computing device 100A. In response to receiving a request to perform such a command, the MFND 102A returns the one or more data structures such as, but not limited to, the BMP 110B and the BDP 206 described above.

In the example shown in FIG. 2B, for instance, the live migration agent 208A has initiated a command 110B from the management API 118 to the parent physical function 112A requesting the BMP 204 from the source MFND 102A. In response to the request for the BMP 204, the parent physical function 112A has retrieved the BMP 204 and returned the BMP 204 to the management API 118. The management API 118, in turn, returns the BMP 204 to the live migration agent 208A.

The live migration agent 208A executing on the source host computing device 100A can utilize the BMP 204 to identify the data that the VM 104A changed in the namespace 202A and to retrieve that data from the MFND 102A. For example, and as illustrated in FIG. 2C, the live migration agent 208A executing on the source host computing device 100A can utilize the BMP 204 to identify mapped logical block addressing ("LBA") pages 210 in the namespace 202A.

In turn, the live migration agent 208A can cause the management API 118 to issue one or more commands 110C to read the mapped LBA pages 210 from the namespace 202A. The parent physical function 112A receives the command 110C and, in response thereto, reads the mapped LBA pages 210 from the namespace 202A and returns the mapped LBA pages 210 in response to the command 110C.

As also illustrated in FIG. 2C, the host computing device 100A can then migrate the retrieved mapped LBA pages 210 to a target namespace 202B on the target MFND 102B. In particular, the live migration agent 208A can provide the mapped LBA pages 210 to a live migration agent 208B executing on the root partition 108B of the target host computing device 100B.

The live migration agent 208A on the target host computing device 100B can then call the management API 118 in order to write the mapped LBA pages 210 to the target namespace 202B. The parent physical function 112D writes the mapped LBA pages 210 to the target namespace 202B on the non-volatile memory device 103B on the target MFND 102B. As shown in FIG. 2C, the target namespace 202B is associated with a child physical function 112E on the target MFND 102B.

Figure 2D:
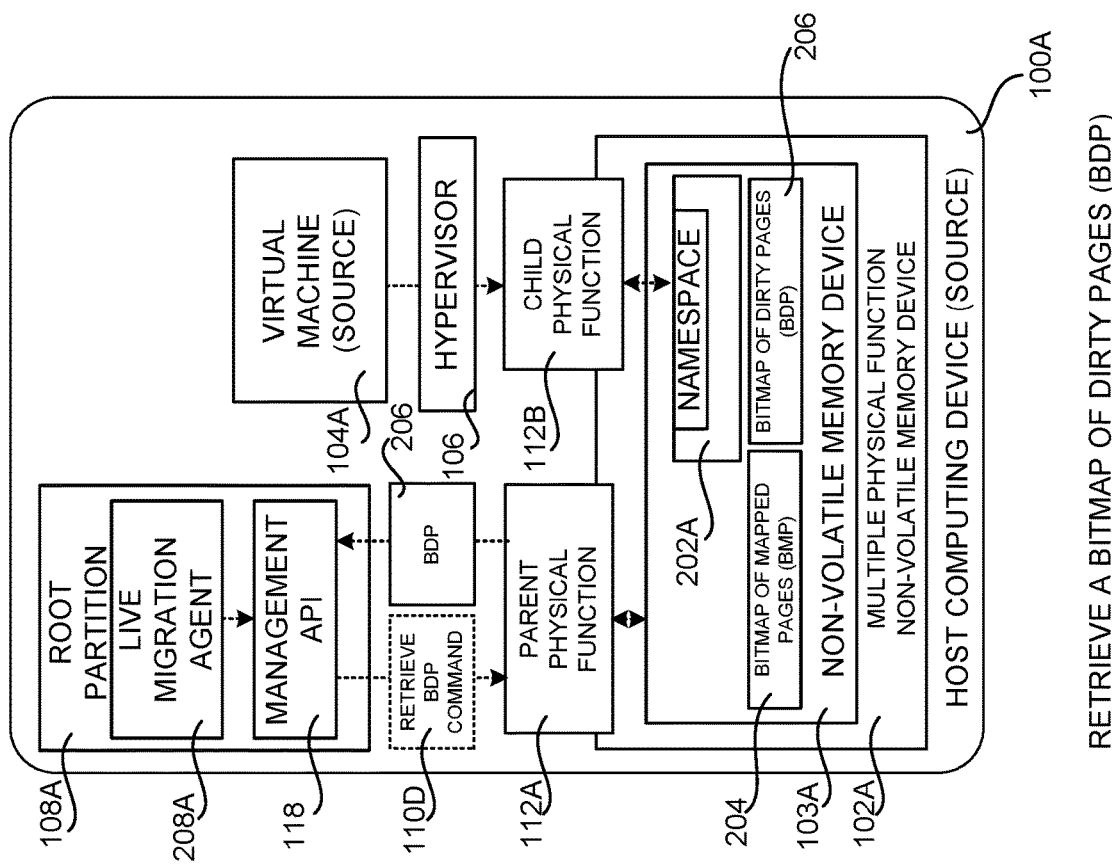
FIG. 2D is a computing architecture diagram showing aspects of one mechanism disclosed herein for retrieving a bitmap of dirty pages from a MFND, according to one embodiment.

As shown in FIG. 2D, the MFND 102A can also be configured to implement a command 110D by which the source host computing device 100A can retrieve the BDP 206. As discussed above, the BDP 206 is a bitmap identifying dirty pages in a namespace 202A assigned to a VM 104A. Dirty pages are pages that have been modified due to write or write zeroes commands, such as those defined by the NVMe Specification.

In the example shown in FIG. 2D, the live migration agent 208A has initiated a command 110D from the management API 118 to the parent physical function 112A requesting the BDP 206 from the source MFND 102A. In response to the request for the BDP 206, the parent physical function 112A has retrieved the BDP 206 and returned the BDP 206 to the management API 118. The management API 118, in turn, returns the BDP 206 to the live migration agent 208A.

Figure 2E:
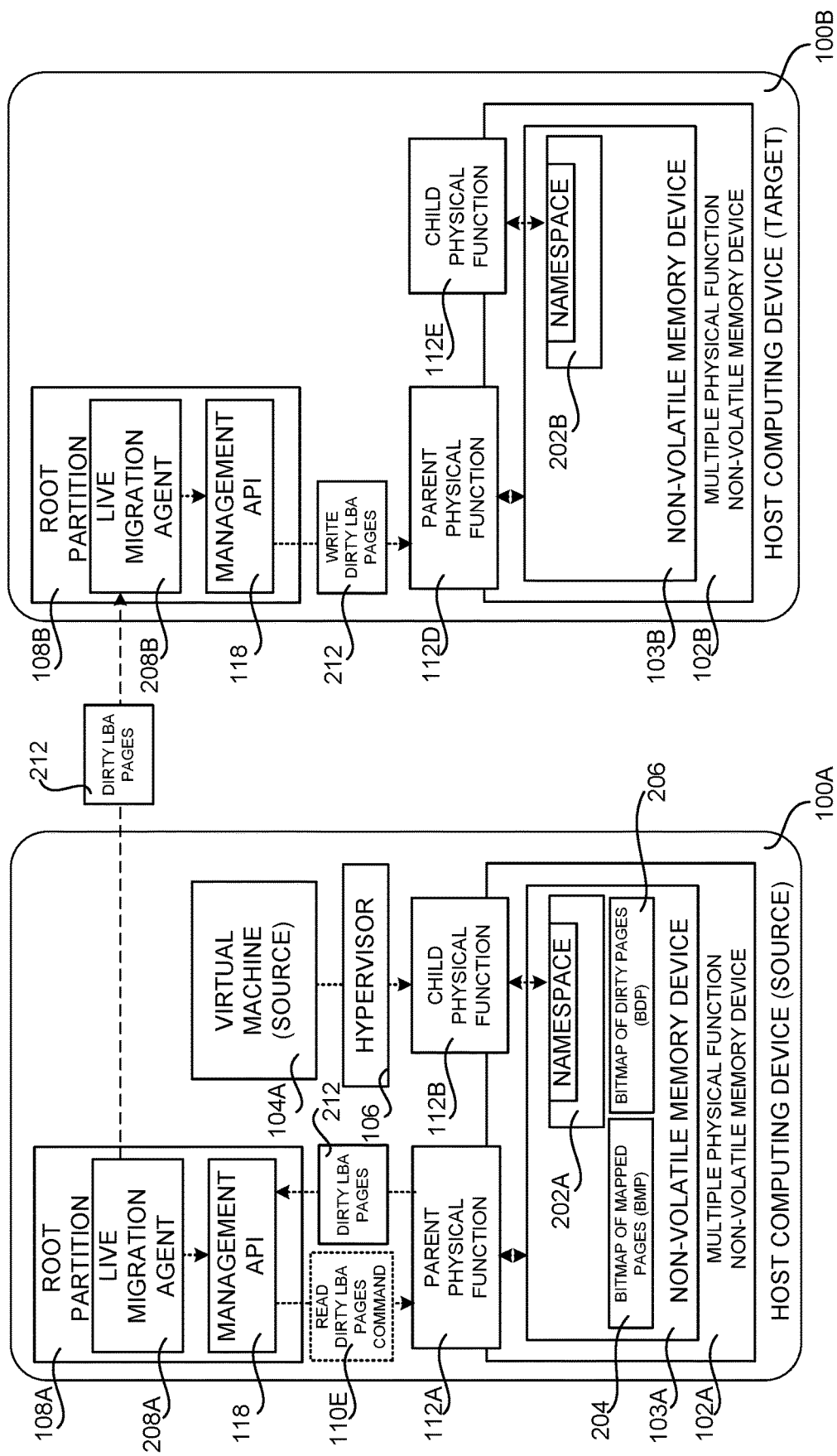
FIG. 2E is a computing architecture diagram showing aspects of one mechanism disclosed herein for reading dirty pages from a source namespace and writing the dirty pages to a namespace provided by a target child physical function of a MFND, according to one embodiment.

The live migration agent 208A executing on the source host computing device 100A can utilize the BDP 206 to identify data that the VM 104A changed in the namespace 202A and to retrieve that data from the MFND 102A. For example, and as illustrated in FIG. 2E, the live migration agent 208A executing on the source host computing device 100A can utilize the BDP 206 to identify dirty LBA pages 212 in the namespace 202A. In turn, the live migration agent 208A can cause the management API 118 to issue one or more commands 110E to read the dirty LBA pages 212 from the namespace 202A. The parent physical function 112A receives the command 110E and, in response thereto, reads the dirty LBA pages 212 from the namespace 202A and returns the dirty LBA pages 212 in response to the command 110E.

As also illustrated in FIG. 2E, the host computing device 100A can then migrate the retrieved dirty LBA pages 212 to the target namespace 202B on the target MFND 102B. In particular, the live migration agent 208A can provide the dirty LBA pages 212 to the live migration agent 208B executing on the root partition 108B of the target host computing device 100B.

The live migration agent 208B on the target host computing device 100B can then call the management API 118 in order to write the dirty LBA pages 212 to the target namespace 202B. The parent physical function 112D writes the dirty LBA pages 212 to the target namespace 202B on the non-volatile memory device 103B on the target MFND 102B. As will be discussed in greater detail below, this process might be repeated multiple times in order to migrate all of the dirty LBA pages 212 from the namespace 202A on the source MFND 102A to the namespace 202B on the target MFND 102B.

Figure 2F:
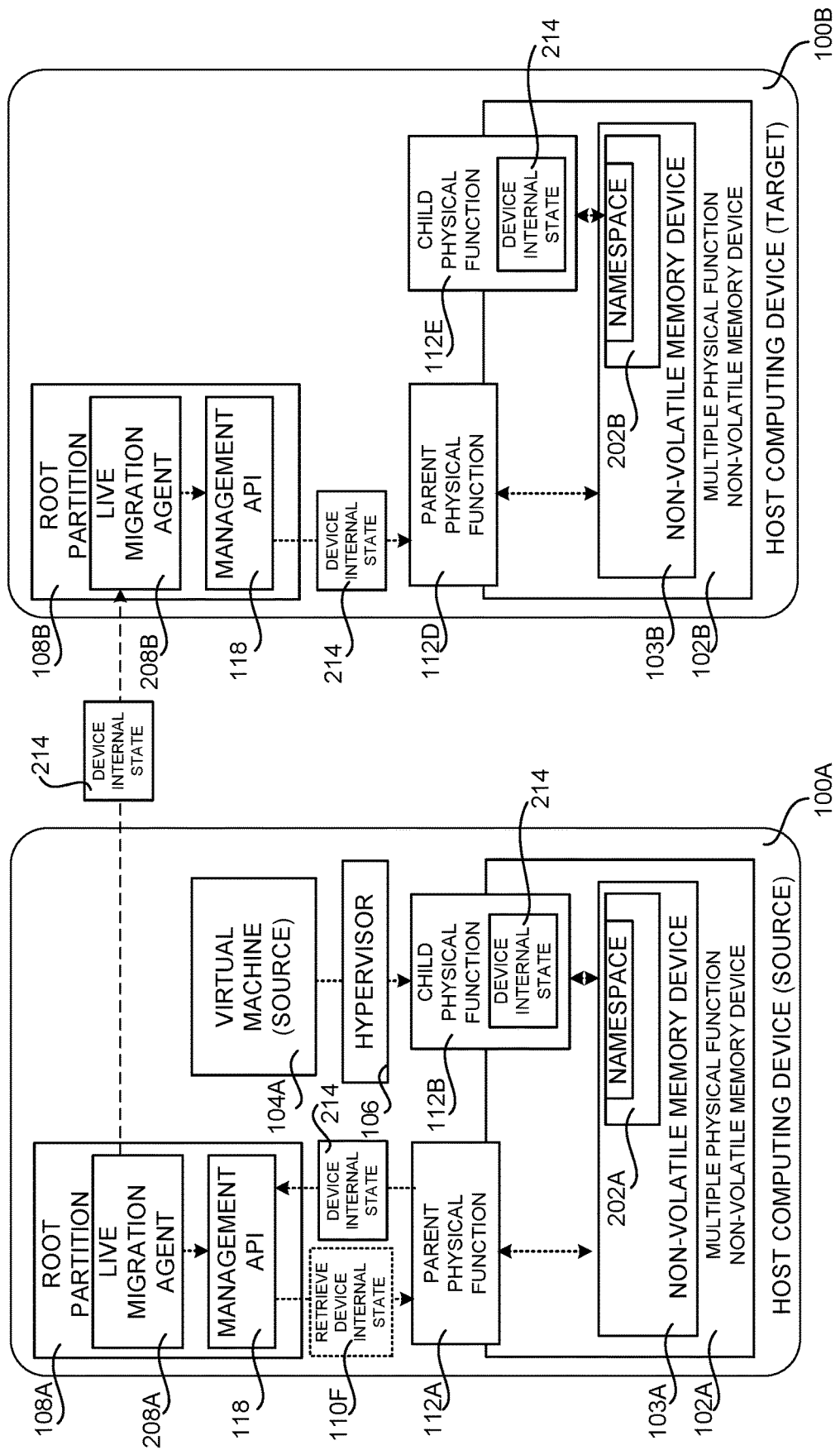
FIG. 2F is a computing architecture diagram showing aspects of one mechanism disclosed herein for reading the device internal state for a source child physical function and writing the device internal state to a target child physical function of a MFND, according to one embodiment.

As shown in FIG. 2F, the MFND 102A can also be configured to implement a command 110F for enabling a host computing device 100A to retrieve a device internal state 214 of the child physical function 112B on the MFND 102B that is assigned to the VM 104A. The device internal state 214 of the child physical function 112B defines the current hardware state of the child physical function 112B. For example, and without limitation, the device internal state 214 can include various data structures containing the contents of an administration queue, the contents of one or more I/O submission queue pairs, the contents of one or more I/O completion queue pairs, and any asynchronous event request commands parked on the child physical function 112B. The device internal state 214 can include different or additional state information in other configurations.

In response to a request to perform the command 110F, the parent function 112A of the source MFND 102A can retrieve the device internal state 214 from the child physical function 112B and provide the device internal state 214 to the live migration agent 208A executing on the source host computing device 100A. In turn, the live migration agent 208A executing on the source host computing device 100A can provide the device internal state 214 to the live migration agent 208B executing on the target host computing device 100B.

The live migration agent 208B executing on the target host computing device 100B can then issue a command to the target MFND 102B to restore the device internal state 214 to the target child physical function 112E. In response to such a command, the parent physical function 112D causes the device internal state 214 to be stored in the child physical function 112E. In this way, the current hardware state of a child physical function 112B on a source MFND 102A can be migrated to a child physical function 112E on a target MFND 102B. This reduces computational overhead of migration, at least because it avoids the need for internal state to be regenerated, and at least because commands that are outstanding (e.g., queued or pending on the device) do not need to be aborted at the child physical function 112B (increasing error counts, and requiring processing at the host of the error), only to be re-submitted to the child physical function 112E on the target MFND 102B.

As shown in FIG. 2F, once the VM data stored in the namespace 202A has been migrated to the target host computing device 100B and stored in the namespace 202B and the device internal state 214 of the child physical function 112B has been migrated to the child physical function 112E, the VM 104A can be resumed on the target host computing device 100B. The resumed VM 104A on the target host computing device might be referred to as the "VM 104B" or the "target VM 104B." In this regard, it is to be appreciated that the VM 104 and the contents of any associated memory are migrated separated from the VM data stored in the namespace 202A. Additional details regarding the functionality provided by the MFNDs 102A and 102B to facilitate live migration of VM data will be provided below with regard to FIGS. 3A-3C and 4.

Figure 3A:
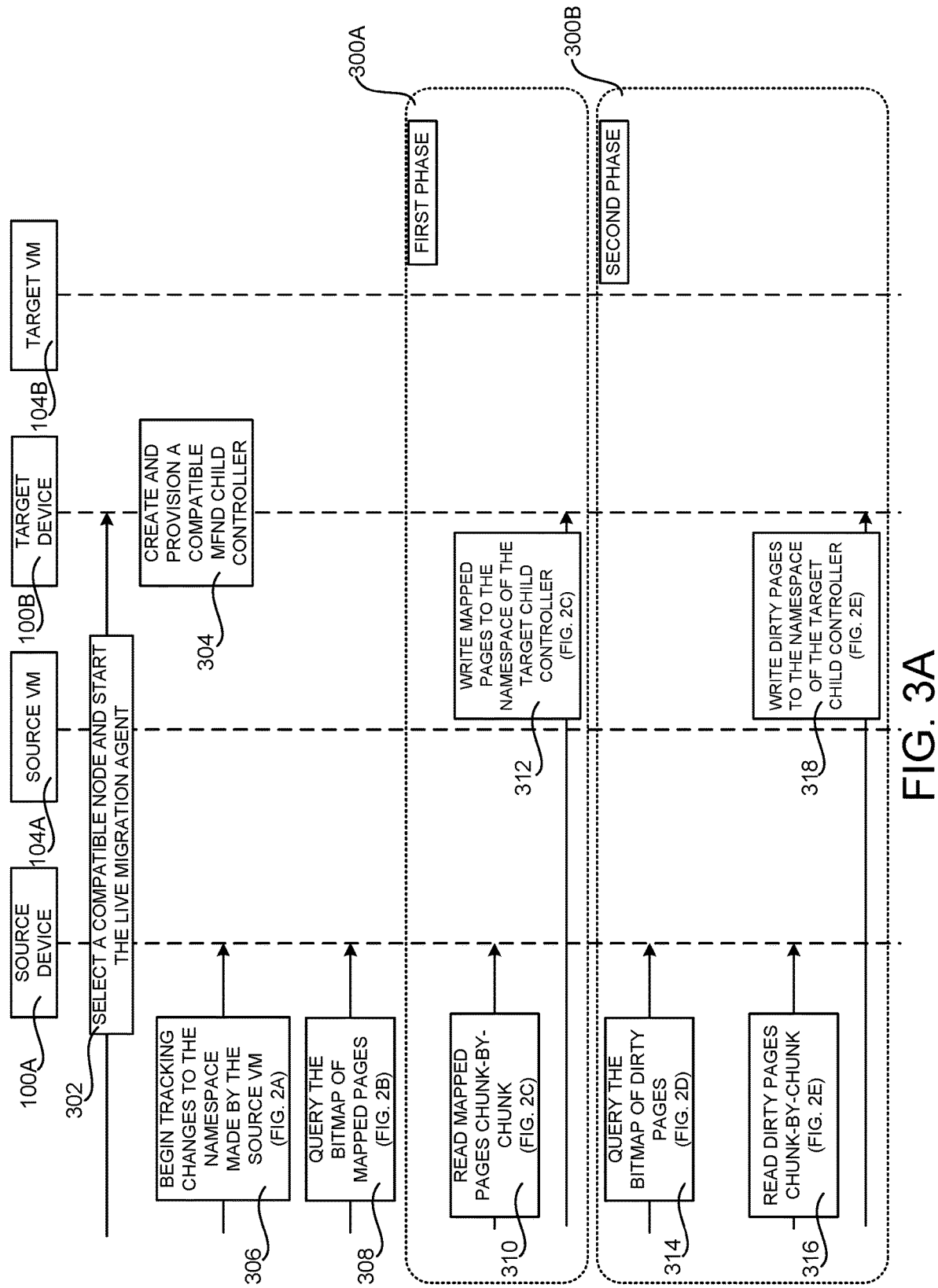
FIG. 3A is a timing diagram showing a routine that illustrates aspects of a method for non-volatile memory device-assisted live migration of VM data, according to one embodiment disclosed herein.
Figure 3B:
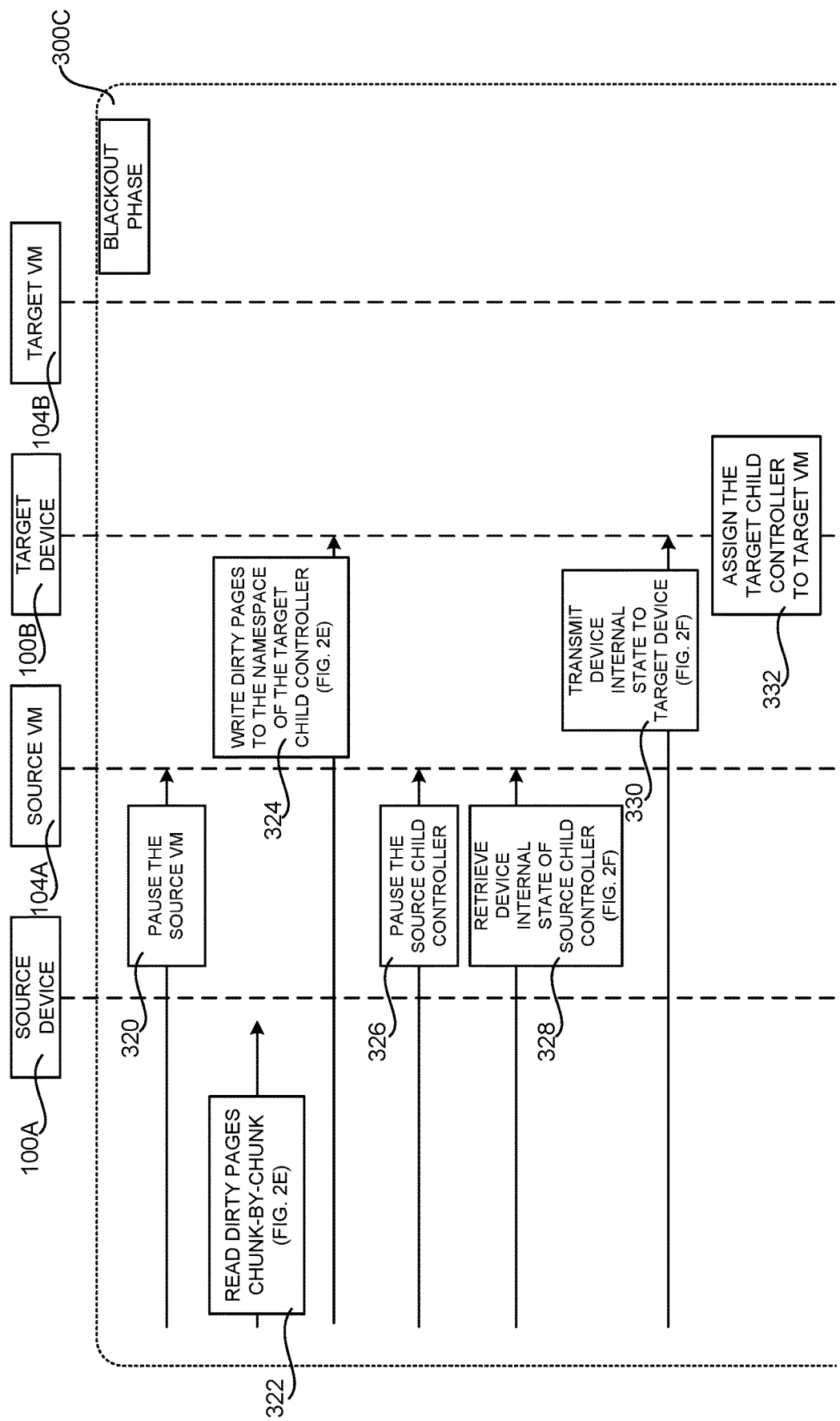
FIG. 3B is a timing diagram showing additional aspects of the routine shown in FIG. 3A for non-volatile memory device-assisted live migration of VM data, according to one embodiment disclosed herein.
Figure 3C:
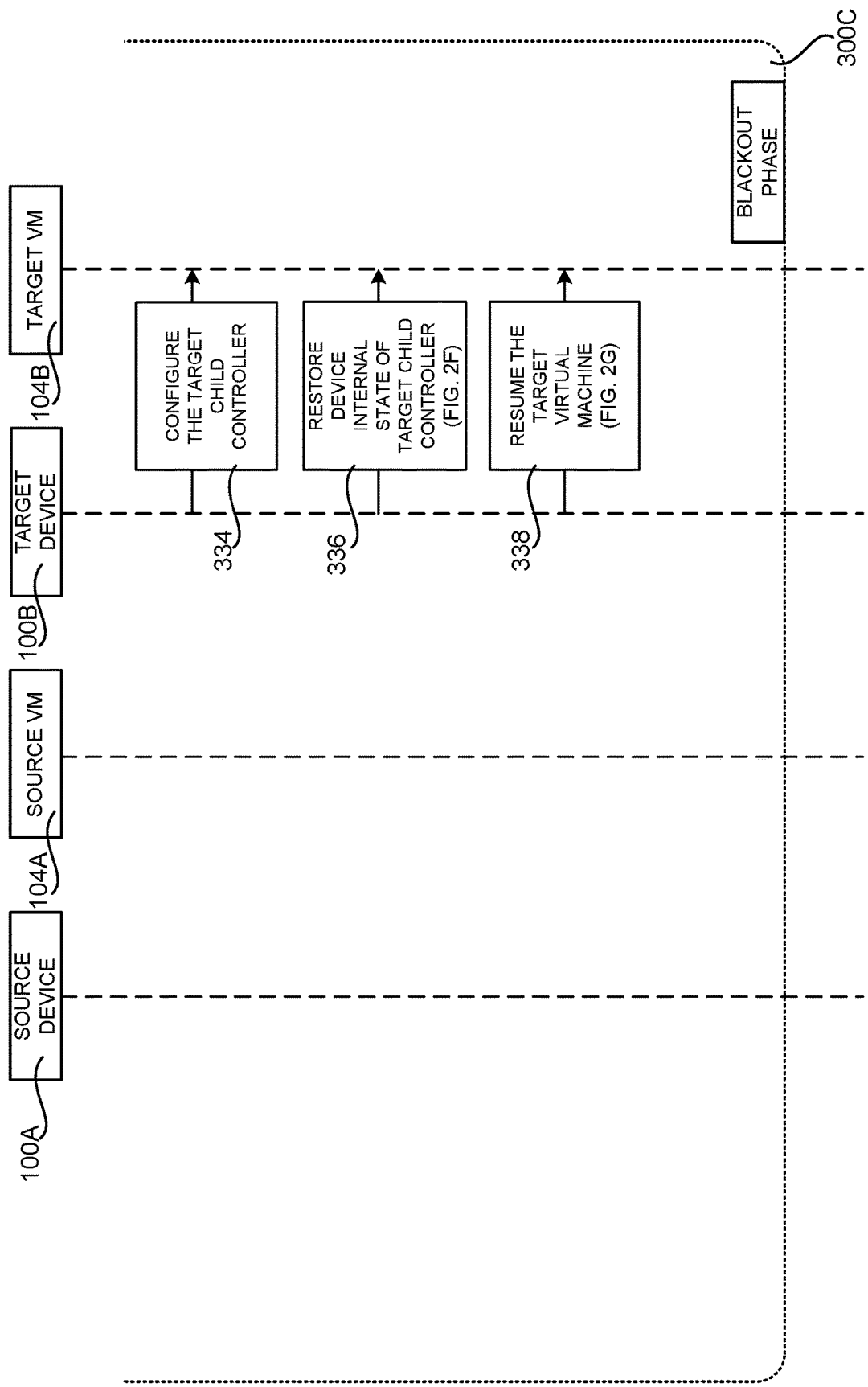
FIG. 3C is a timing diagram showing additional aspects of the routine shown in FIGS. 3A and 3B for non-volatile memory device-assisted live migration of VM data, according to one embodiment disclosed herein.

FIGS. 3A-3C are timing diagrams showing a routine that illustrates aspects of a method for non-volatile memory device-assisted live migration of VM data, according to one embodiment disclosed herein. It should be appreciated that the logical operations described herein with regard to FIGS. 3A-3C, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine illustrated in FIGS. 3A-3C begins at operation 302, where a compatible target host computing device 100B is selected as the target for migrating a source VM 104A from a source host computing device 100B. In one embodiment, a compatible target host computing device 100B is a host computing device provisioned with a MFND 102B manufactured by the same manufacturer as the MFND 102A in the source host computing device 100A. In other embodiments, the MFND 102B can be provided by a different manufacturer than the MFND 102A in the source host computing device 100A. In other embodiments, the MFND 102A or the MFND 102B are SFNDs. Other parameters might be measured and utilized to determine whether a target host computing device 100B is suitable for migrating a source VM 104A.

Once a compatible target host computing device 100B has been selected, the live migration agent 208B is initiated on the selected target host computing device 100B. The routine illustrated in FIGS. 3A-3C then continues from operation 302 to operation 304, where a child PF 112E is created and provisioned on the MFND 102B of the selected target host computing device 100B. As discussed briefly above and in greater detail below, the child PF 112E provides direct access to the namespace 202B on the MFND 102B to the migrated VM 104B.

From operation 304, the illustrated routine proceeds from operation 304 to operation 306. At operation 306, the source host computing device 100A requests that the source MFND 102A begin tracking changes to the namespace 202A by the associated VM 104A using the command 110A described above with respect to FIG. 2A. In response thereto, the source MFND 102A tracks changes made by the source VM 104A to the namespace 202A and stores one or more data structures such as the BMP 204 described above that identify the changed portions of the namespace 202A.

The routine then proceeds from operation 306 to operation 308, where the source host computing device 100A requests the BMP 204 from the MFND 102A in the manner described above with respect to FIG. 2B. When the source host computing device 100A has retrieved the BMP 204, the source host computing device 100A utilizes the BMP 204 to identify the mapped LBA pages 210 in the namespace 202A. In turn, the source host computing device 100A reads the mapped LBA pages 210 chunk-by-chunk from the namespace 202A at operation 310 in the manner described above with regard to FIG. 2C.

The routine then proceeds to operation 312, where the source host computing device 100A transmits the mapped LBA pages 210 to the live migration agent 208B executing on the target host computing device 100B. The live migration agent 208B executing on the target host computing device 100B then causes the contents of the mapped LBA pages 210 to be written to the namespace 202B on the MFND 102B. The operations 310 and 312 may be repeated as necessary to migrate all of the mapped LBA pages 210 from the MFND 102A to the MFND 102B. This process may be referred to herein as the "first phase 300A" of migration.

Once the first phase 300A has completed, the illustrated routine proceeds to operation 314, where a "second phase 300B" of migration begins. In particular, at operation 314, the source host computing device 100A requests the BDP 206 from the MFND 102A in the manner described above with respect to FIG. 2D. Once the source host computing device 100A has retrieved the BDP 206, the source host computing device 100A utilizes the BDP 206 to identify the dirty LBA pages 212 in the namespace 202A. In turn, the source host computing device 100A reads the dirty LBA pages 212 chunk-by-chunk from the namespace 202A at operation 316 in the manner described above with regard to FIG. 2E.

The routine then proceeds to operation 318, where the source host computing device 100A transmits the dirty LBA pages 212 to the live migration agent 208B executing on the target host computing device 100B. The live migration agent 208B executing on the target host computing device 100B then causes the dirty LBA pages 212 to be written to the namespace 202B on the MFND 102B. The operations 314 and 316 may be repeated as necessary to migrate all of the dirty LBA pages 212 from the MFND 102A to the MFND 102B.

Once the second phase 300B has completed (e.g., when the number of dirty LBA pages 212 drops below a threshold), the illustrated routine proceeds from operation 318 to operation 320, illustrated in FIG. 3B, where a "blackout phase 300C" begins. The blackout phase 300C begins at operation 320, where execution of the source VM 104A is paused. The routine then proceeds to operation 322, where the source host computing device 100A once again requests the BDP 206 from the MFND 102A in the manner described above with respect to FIG. 2D and utilizes the BDP 206 to identify any remaining dirty LBA pages 212 in the namespace 202A. The source host computing device 100A then reads the remaining dirty LBA pages 212 chunk-by-chunk from the namespace 202A at operation 322 in the manner described above with regard to FIG. 2E.

The routine then proceeds to operation 324, where the source host computing device 100A transmits any remaining dirty LBA pages 212 to the live migration agent 208B executing on the target host computing device 100B. The live migration agent 208B executing on the target host computing device 100B then causes the remaining dirty LBA pages 212 to be written to the namespace 202B on the MFND 102B.

From operation 324, the illustrated routine proceeds to operation 326, where the child physical function 112B on the source MFND 102A is paused. When the child physical function 112B is paused, the child physical function 112B will complete the processing of all in-progress commands. In-progress commands are commands that the child physical function 112B has dequeued from a submission queue and is actively processing but not yet finished and reported as completed in a completion queue. By pausing the source child physical function 112B in this manner, no further changes will be made to the device internal state 214 of the child physical function 112B.

Once the child physical function 112B has been paused in the manner described above, the routine proceeds to operation 328, where the source host computing device 100A can utilize the command 110F described above with regard to FIG. 2F to retrieve the device internal state 214 from the child physical function 112B on the source MFND 102A that is assigned to the VM 104A.

Once the source host computing device 100A has retrieved the device internal state 214, the source host computing device 100A transmits the device internal state 214 to the live migration agent 208B executing on the target host computing device 100B. As discussed above with regard to FIG. 2G, and as will be discussed in greater detail below, the live migration agent 208B causes the device internal state 214 retrieved from the child physical function 112B to be restored to the child physical function 112E provisioned on the MFND 102B of the target host computing device 100B at operation 304.

From operation 332, the illustrated routine proceeds to operation 334, shown in FIG. 3C. At operation 334, the child physical function 112E can be configured in the same manner as the child physical function 112B. For example, and without configuration, a I/O queue pair configuration can be retrieved from the child physical function 112B and the child physical function 112B can be configured in the same manner. Other configuration parameters can be migrated in a similar fashion.

Figure 2G:
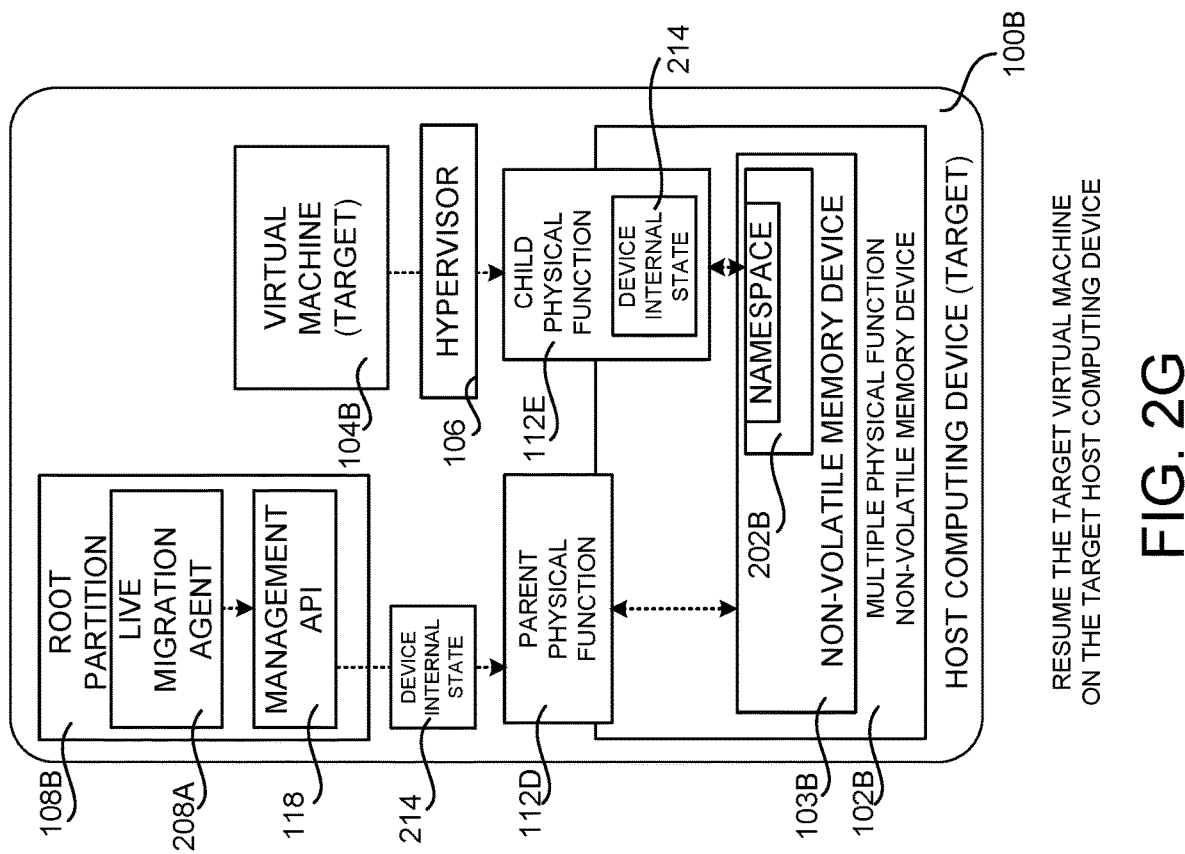
FIG. 2G is a computing architecture diagram showing aspects of one mechanism disclosed herein for resuming a target VM on a target host computing device, according to one embodiment.

Once the child physical function 112E has been configured, the routine proceeds to operation 336, where the live migration agent 208B executing on the target host computing device 100B causes the device internal state 214 to be restored to the child physical function 112E in the manner describe above with regard to FIG. 2G. Once the mapped and dirty LBA pages 210 and 212 from the namespace 202A have been migrated, the device internal state 214 has been migrated, and the child physical function 112E has been configured, the VM 104B is resumed on the target host computing device 100B at operation 338.

It is to be appreciated that, in some embodiments, Quality of Service ("QoS") levels may be set prior to the start of the live migration process described above for both the source VM 104A and the parent physical function 112A to regulate the storage I/O performance allowed by the VM 104A and the parent physical function 112A during the live migration process on the source host computing device 100A. In order to provide this functionality, the MFND 102A can support multiple storage service level agreements ("SLAs").

Each SLA supported by the MFND 102A can define a different QoS level to be provided by a PF 112A-112N. QoS levels that can be supported by child PFs 112 on the MFND 102A include, but are not limited to, a "reserve mode" wherein a child PF 112 is allocated at least a specified minimum amount of bandwidth and input/output operations per second ("IOPS"), a "limit mode" wherein a child PF 112 is allocated at most a specified maximum amount of bandwidth and IOPS, and a "mixed mode" wherein a child PF 112 is allocated at least a specified minimum amount of bandwidth and IOPS but at most a specified maximum amount of bandwidth and IOPS. Other QoS levels can be implemented in other embodiments. The MFND 102A can support methods for querying and setting the QoS for physical functions on the device.

Figure 4:
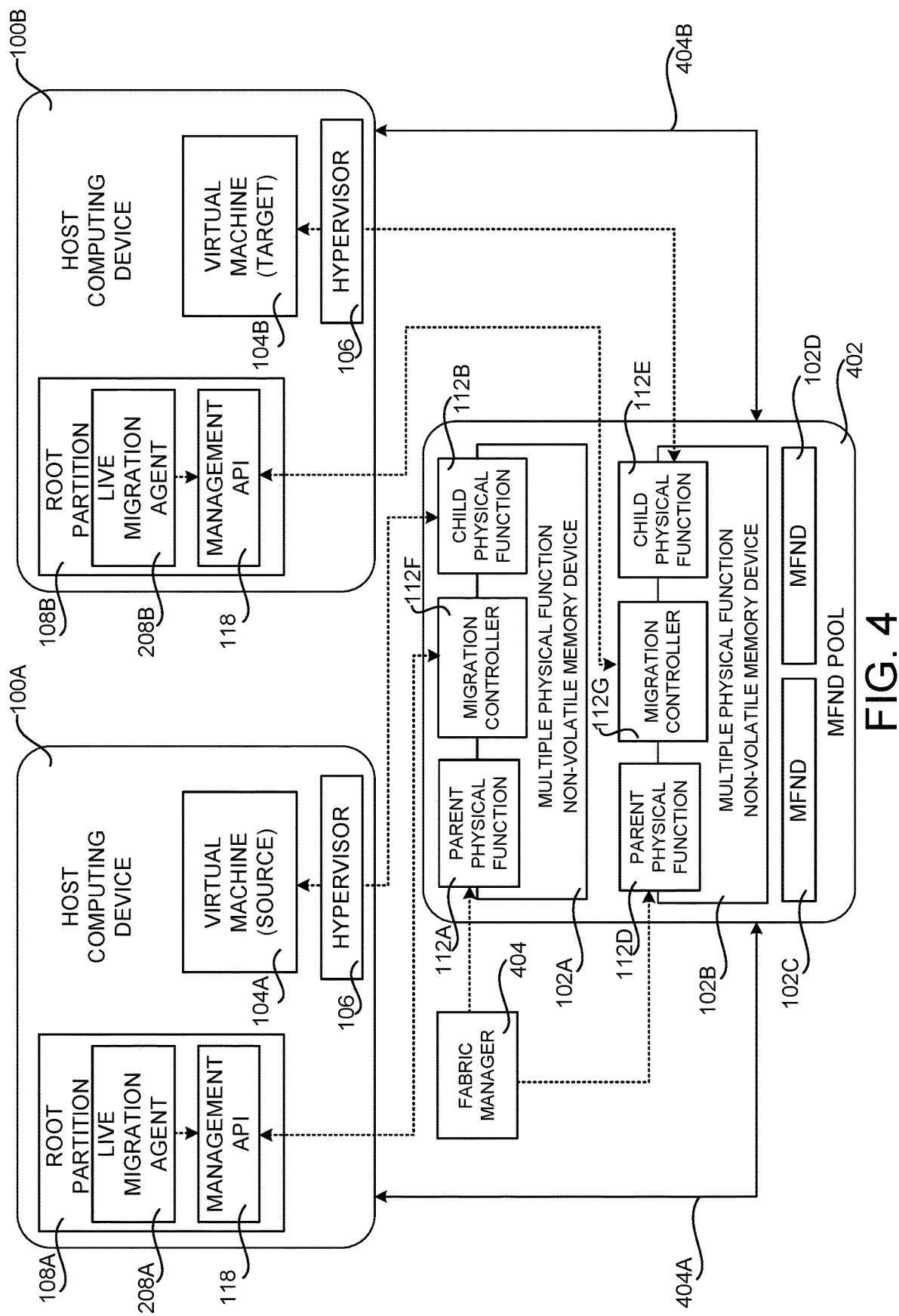
FIG. 4 is a computing architecture diagram showing aspects of an alternate topology in which the embodiments disclosed herein for non-volatile memory device-assisted live migration of VM data may be implemented, according to one embodiment.

FIG. 4 is a computing architecture diagram showing aspects of an alternate topology in which the embodiments disclosed herein for non-volatile memory device-assisted live migration of VM data may be implemented, according to one embodiment. In the embodiments described above, each host computing device 100A and 100B is provisioned with its own MFND 102A and 102B, respectively. In the embodiment shown in FIG. 4, however, the MFNDs 102A and 102B and, potentially other MFNDs 102C and 102D, are provisioned in a MFND pool 402 that is shared among multiple host computing devices, such as the host computing devices 100A and 100B.

The host computing devices 100A and 100B can connect to the MFNDs 102A-102D in the MFND pool 402 utilizing various connections 404A and 404B, respectively. For example, and without limitation, various PCIe interconnects, switches, and other components may be utilized to interconnect the host computing devices 100A and 100B and the devices in the MFND pool 402.

In the embodiments described above, the management API 118 on the host computing devices 100A and 100B issues commands to the respective parent physical functions 112B and 112D in order to provide the functionality described above for live migration of VM data. In the embodiment shown in FIG. 4, however, the host computing devices 100A and 100B do not have access to the parent physical functions 112A and 112D of the MFNDs 102A and 102B, respectively. This limitation might be implemented for security purposes and potentially other reasons.

Rather, in the embodiment shown in FIG. 4, an available child physical function on the MFNDs 102A and 102B is designated as a "migration controller." For instance, in the illustrated embodiment, a child physical function on the MFND 102A has been designated as the migration controller 112F and a child physical function on the MFND 102A has been designated as the migration controller 112G. A fabric manager 404 has selected the child physical functions to be designated as the migration controllers 112F and 112G and provided instructions to the parent physical functions 112A and 112D, respectively, to configure the selected child physical functions as such.

Although the migration controllers 112F and 112G are child physical functions, the migration controllers 112F and 112G are configured to provide the functionality provided by the parent physical functions 112A and 112D in the embodiments described above with respect to FIGS. 2A-3C. To enable this functionality, the migration controllers 112F and 112G are configured to implement a subset of the functionality provided by the parent physical functions 112A and 112D described above. For example, and without limitation, the migration controllers 112F and 112G can be configured to implement the functionality provided by the parent physical functions 112A and 112D described above with respect to FIGS. 2A-3C. Using this functionality, live migration can be performed in the manner described above utilizing the migration controllers 112F and 112G rather than the parent physical functions 112A and 112D.

Figure 5:
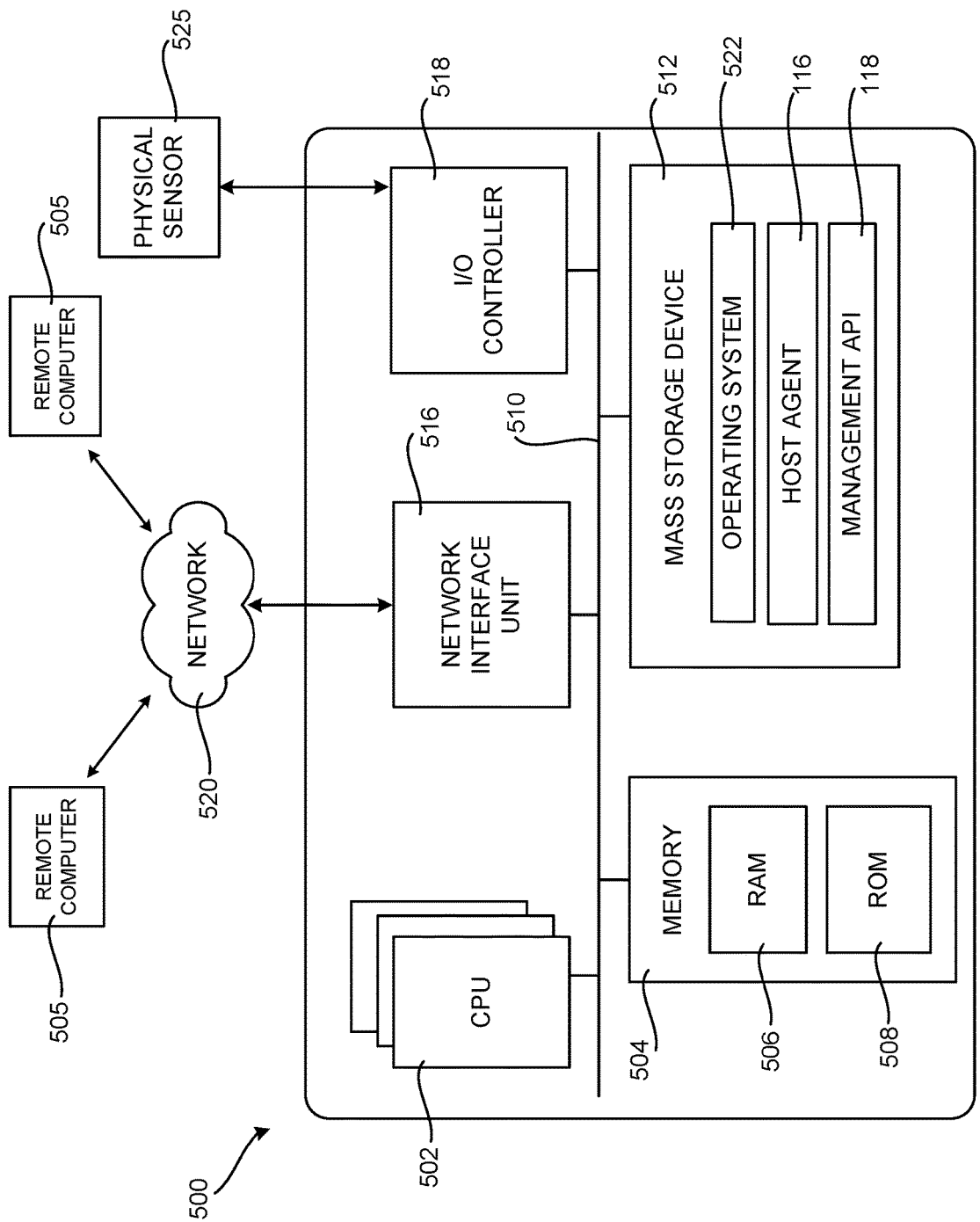
FIG. 5 is a computer architecture diagram showing an illustrative computer hardware and software architecture for a computing device that can act as a host for a non-volatile memory device that implements aspects of the technologies presented herein.

FIG. 5 is a computer architecture diagram showing an illustrative computer hardware and software architecture for a data processing system 500 that can act as a host 100 for a MFND 102 or a SFND that implements aspects of the technologies presented herein. In particular, the architecture illustrated in FIG. 5 can be utilized to implement a server computer, mobile phone, an e-reader, a smartphone, a desktop computer, an AR/VR device, a tablet computer, a laptop computer, or another type of computing device that acts as a host 100 for the MFND 102 or an SFND.

The data processing system 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the data processing system 500, such as during startup, can be stored in the ROM 508. The data processing system 500 further includes a mass storage device 512 for storing an operating system 522, application programs, and other types of programs. For example, the mass storage device 512 might store the host agent 116 and the management API 118. The mass storage device 512 can also be configured to store other types of programs and data.

The mass storage device 512 is connected to the CPU 502 through a mass storage controller (not shown) connected to the bus 510. The mass storage device 512 and its associated computer readable media provide non-volatile storage for the data processing system 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the data processing system 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the data processing system 500. For purposes of the claims, the phrase "computer storage medium," and variations thereof, does not include waves or signals per se or communication media.

According to various configurations, the data processing system 500 can operate in a networked environment using logical connections to remote computers through a network such as the network 520. The data processing system 500 can connect to the network 520 through a network interface unit 516 connected to the bus 510. It should be appreciated that the network interface unit 516 can also be utilized to connect to other types of networks and remote computer systems. The data processing system 500 can also include an input/output controller 518 for receiving and processing input from a number of other devices, including a keyboard, mouse, touch input, an electronic stylus (not shown in FIG. 5), or a physical sensor such as a video camera. Similarly, the input/output controller 518 can provide output to a display screen or other type of output device (also not shown in FIG. 5).

It should be appreciated that the software components described herein, when loaded into the CPU 502 and executed, can transform the CPU 502 and the overall data processing system 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the data processing system 500 in order to store and execute the software components presented herein. It also should be appreciated that the architecture shown in FIG. 5 for the data processing system 500, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the data processing system 500 might not include all of the components shown in FIG. 5, can include other components that are not explicitly shown in FIG. 5, or can utilize an architecture completely different than that shown in FIG. 5.

Figure 6:
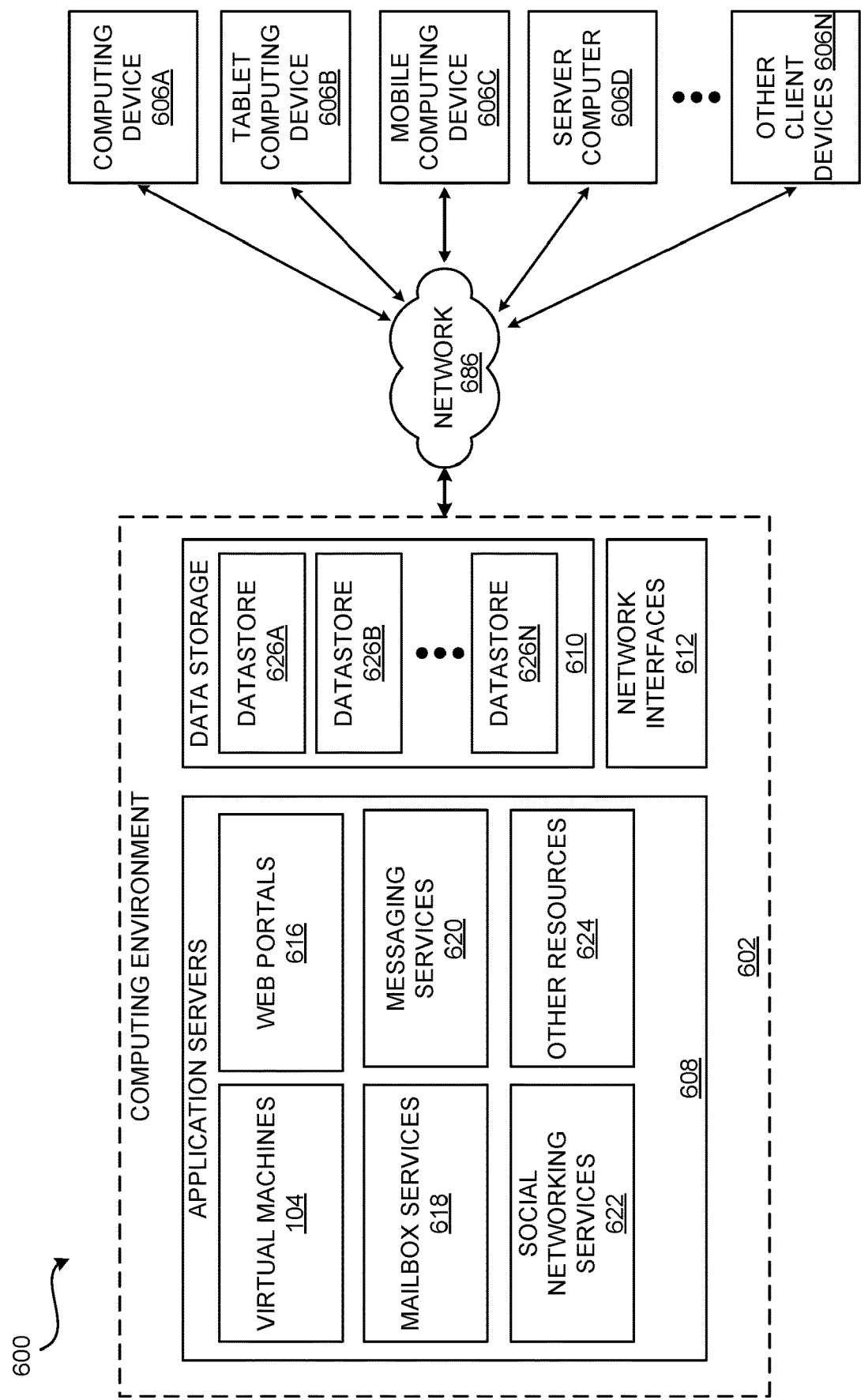
FIG. 6 is a computing network architecture diagram showing an illustrative configuration for a computing environment in which computing devices hosting MFNDs implementing the disclosed technologies can be utilized.

FIG. 6 is a computing network architecture diagram showing an illustrative configuration for a distributed computing environment 600 in which computing devices hosting MFNDs 102 implementing the disclosed technologies can be utilized. According to various implementations, the distributed computing environment 600 includes a computing environment 602 operating in communication with a network 686. One or more client devices 606A-606N (hereinafter referred to collectively and/or generically as "clients 606") can communicate with the computing environment 602 via the network 686 and/or other connections (not illustrated in FIG. 6).

In one illustrated configuration, the clients 606 include a computing device 606A such as a laptop computer, a desktop computer, or other computing device; a tablet computing device ("tablet computing device") 606B; a mobile computing device 606C such as a smartphone, an on-board computer, or other mobile computing device; or a server computer 606D. It should be understood that any number of devices 606 can communicate with the computing environment 602. An example computing architecture for the devices 606 is illustrated and described above with reference to FIG. 5. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, VMs 104, portals, and/or other resources. The application servers 608 can also be implemented using host computing devices 100 that includes MFNDs 102 configured in the manner described herein.

In the illustrated configuration, the application servers 608 host one or more VMs 104 for hosting applications, network services, or for providing other functionality. It should be understood that this configuration is illustrative only and should not be construed as being limiting in any way. The application servers 608 can also host or provide access to one or more portals, link pages, web sites, network services, and/or other information sites, such as web portals 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also might include one or more social networking services 622. The social networking services 622 can include various social networking services including, but not limited to, services for sharing or posting status updates, instant messages, links, photos, videos, and/ or other information; services for commenting or displaying interest in articles, products, blogs, or other resources; and/or other services. Other services are possible and are contemplated.

The social networking services 622 also can include commenting, blogging, and/or micro blogging services. Other services are possible and are contemplated. As shown in FIG. 6, the application servers 608 also can host other network services, applications, portals, and/or other resources ("other resources") 624. The other resources 624 can include, but are not limited to, document sharing, rendering, or any other functionality.

As mentioned above, the computing environment 602 can include data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual data stores 626A-626N (hereinafter referred to collectively and/or generically as "datastores 626").

The datastores 626 are configured to host data used or created by the application servers 608 and/or other data. Although not illustrated in FIG. 6, the datastores 626 also can host or store web page documents, word processing documents, presentation documents, data structures, and/or other data utilized by any application program or another module. Aspects of the datastores 626 might be associated with a service for storing files.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also might be utilized to connect to other types of networks and/or computer systems.

It should be understood that the distributed computing environment 600 described herein can implement aspects of at least some of the software elements described herein with any number of virtual computing resources and/or other distributed computing functionality that can be configured to execute any aspects of the software components disclosed herein.

It should be further understood that the disclosure presented herein also encompasses the subject matter set forth in the following clauses:

Clause 1. A computer-implemented method, comprising: receiving a first request at a non-volatile memory device, the first request comprising a request to track changes to a namespace made by a virtual machine (VM); responsive to the first request, causing the non-volatile memory device to track changes to the namespace made by the VM in one or more data structures; receiving one or more second requests at the non-volatile memory device, the one or more second requests comprising requests for the one or more data structures corresponding to at least a portion of the tracked changes to the namespace; and providing the one or more data structures from the non-volatile memory device to a host computing device in response to the one or more second requests.

Clause 2. The computer-implemented method of clause 1, wherein the first request and the one or more second requests are received at a parent physical function of the non-volatile memory device.

Clause 3. The computer-implemented method of any of clauses 1 or 2, wherein the non-volatile memory device comprises a multiple physical function non-volatile memory device (MFND), and wherein the first request and the one or more second requests are received at a child physical function of the MFND that has been designated as a migration controller.

Clause 4. The computer-implemented method of any of clauses 1-3, wherein the one or more data structures comprise one or more data structures selected from the group consisting of a bitmap of mapped pages, a bitmap of dirty pages, an ordered list of mapped page ranges, and an ordered list of dirty page ranges.

Clause 5. The computer-implemented method of any of clauses 1-4, further comprising: receiving a third request at the non-volatile memory device, the third request comprising a request for a device internal state of a child physical function assigned to the VM; and responsive to the third request, providing the device internal state of the child physical function assigned to the VM to the host computing device.

Clause 6. The computer-implemented method of any of clauses 1-5, wherein the device internal state comprises one or more data structures selected from the group consisting of an administration queue, one or more input/output (I/O) submission queue pairs, one or more I/O completion queue pairs, and any asynchronous event request commands parked on the child physical function assigned to the VM.

Clause 7. The computer-implemented method of any of clauses 1-6, further comprising: receiving a fourth request at the non-volatile memory device, the fourth request comprising a request to restore a device internal state of a child physical function provided by the non-volatile memory device; and responsive to the third request, restoring the device internal state of the child physical function.

Clause 8. A non-volatile memory device, comprising a non-volatile memory storing a namespace associated with a virtual machine, the non-volatile memory device configured to: receive a first request, the first request comprising a request to track changes to the namespace made by the VM in one or more data structures; track changes to the namespace made by the VM in the one or more data structures responsive to the first request; receive one or more second requests, the one or more second requests comprising requests for the one or more data structures; and provide the one or more data structures from the non-volatile memory device to a host computing device in response to the one or more second requests.

Clause 9. The non-volatile memory device of clause 8, wherein the non-volatile memory device comprises a multiple physical function non-volatile memory device (MFND) comprising a parent physical function, and wherein the first request and the second request are received at the parent physical function of the MFND.

Clause 10. The non-volatile memory device of any of clauses 8 or 9, wherein the non-volatile memory device comprises a multiple physical function non-volatile memory device (MFND) comprising a child physical function that has been designated as a migration controller, and wherein the first request and the second request are received at the child physical function of the MFND.

Clause 11. The non-volatile memory device of any of clauses 8-10, wherein the non-volatile memory device comprises a single physical function non-volatile memory device (SFND).

Clause 12. The non-volatile memory device of any of clauses 8-11, wherein the one or more data structures comprise one or more data structures selected from the group consisting of a bitmap of mapped pages, a bitmap of dirty pages, an ordered list of mapped page ranges, and an ordered list of dirty page ranges.

Clause 13. The non-volatile memory device of any of clauses 8-12, further configured to: receive a third request, the third request comprising a request for a device internal state of a child physical function assigned to the VM; and provide the device internal state of the child physical function assigned to the VM responsive to the third request.

Clause 14. The non-volatile memory device of any of clauses 8-13, further configured to: receive a fourth request, the fourth request comprising a request to restore a device internal state of a child physical function provided by the non-volatile memory device; and restore the device internal state of the child physical function responsive to the fourth request.

Clause 15. A computer-implemented method, comprising: providing a first request to a first non-volatile memory device, the first request comprising a request to track changes to a namespace made by a virtual machine (VM) in one or more data structures; providing one or more second requests to the first non-volatile memory device, the one or more second requests comprising requests for the one or more data structures identifying the changes to the namespace made by the VM; receiving the one or more data structures from the first non-volatile memory device responsive to the second request; identifying, based on the one or more data structures, data changed by the VM in the namespace; providing one or more third requests to the first non-volatile memory device, the one or more third requests comprising requests for the data changed by the VM in the namespace; and causing the data changed by the VM in the namespace to be written to a second namespace on a second non-volatile memory device.

Clause 16. The computer-implemented method of clause 15, further comprising: providing a fourth request to the first non-volatile memory device, the fourth request comprising a request for a device internal state of a child physical function assigned to the VM; receiving the device internal state from the first non-volatile memory device in response to the fourth request; and causing the device internal state to be restored to a child physical function on the second non-volatile memory device.

Clause 17. The computer-implemented method of any of clauses 15 or 16, wherein the first non-volatile memory device comprises a parent physical function, and wherein the first request, the one or more second requests, and the one or more third requests are received at the parent physical function of the first non-volatile memory device.

Clause 18. The computer-implemented method of any of clauses 15-17, wherein the first non-volatile memory device comprises a child physical function that has been designated as a migration controller, and wherein the first request, the one or more second requests, and the one or more third requests are received at the child physical function of the non-volatile memory device.

Clause 19. The computer-implemented method of any of clauses 15-18, wherein the non-volatile memory device comprises a single physical function non-volatile memory device (SFND).

Clause 20. The computer-implemented method of any of clauses 15-19, wherein the one or more data structures comprise one or more data structures selected from the group consisting of a bitmap of mapped pages, a bitmap of dirty pages, an ordered list of mapped page ranges, and an ordered list of dirty page ranges.

Although the technologies presented herein have been described in language specific to structural features and/or methodological acts, it is to be understood that the appended claims are not necessarily limited to the features or acts described. Rather, the features and acts are described as example implementations of such technologies. Moreover, the above-described subject matter may be implemented as a computer-controlled apparatus, a computer process, a computing system, or as an article of manufacture such as a computer-readable storage medium.

The operations of the example methods presented herein are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more instances of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
designating a child physical function of a multiple physical function non-volatile memory device as a migration controller, wherein the child physical function implements a subset of functionality provided via a parent physical function to limit data access for a plurality of host computing devices;
receiving a first request, at the migration controller, for tracking changes to a namespace made by a virtual machine;
responsive to receiving the first request, causing the multiple physical function non-volatile memory device to track the changes to the namespace made by the virtual machine in one or more data structures;
receiving a second request, at the migration controller, for a particular data structure of the one or more data structures that corresponds to at least a portion of the changes to the namespace made by the virtual machine; and
responsive to receiving the second request, providing the particular data structure from the migration controller to a particular host computing device of the plurality of host computing devices.

2. The computer-implemented method of claim 1, wherein the one or more data structures are selected from a group consisting of a bitmap of mapped pages, a bitmap of dirty pages, an ordered list of mapped page ranges, and an ordered list of dirty page ranges.

3. The computer-implemented method of claim 1, further comprising:
receiving a third request, at the migration controller, for a device internal state of the child physical function; and
responsive to receiving the third request, providing the device internal state of the child physical function to the particular host computing device.

4. The computer-implemented method of claim 3, wherein the device internal state comprises at least one of an administration queue, one or more input/output (I/O) submission queue pairs, one or more I/O completion queue pairs, or an asynchronous event request commands parked on the child physical function.

5. The computer-implemented method of claim 1, further comprising:
receiving a third request, at the migration controller, to restore a device internal state of the child physical function; and
responsive to receiving the third request, restoring the device internal state of the child physical function.

6. The computer-implemented method of claim 1, wherein the parent physical function is inaccessible to the plurality of host computing devices for security reasons.

7. The computer-implemented method of claim 1, wherein the child physical function is configured with the subset of functionality by the parent physical function.

8. A multiple physical function non-volatile memory device, comprising a non-volatile memory storing a namespace associated with a virtual machine, the multiple physical function non-volatile memory device configured to:
designate a child physical function of the multiple physical function non-volatile memory device as a migration controller, wherein the child physical function implements a subset of functionality provided via a parent physical function to limit data access for a plurality of host computing devices;
receive a first request, at the migration controller, to track changes to the namespace associated with the virtual machine;
responsive to receiving the first request, track the changes to the namespace associated with the virtual machine in one or more data structures;
receive a second request, at the migration controller, for a particular data structure of the one or more data structures; and
responsive to receiving the second request, provide the particular data structure from the migration controller to a particular host computing device of the plurality of host computing devices.

9. The multiple physical function non-volatile memory device of claim 8, wherein the one or more data structures are selected from the group consisting of a bitmap of mapped pages, a bitmap of dirty pages, an ordered list of mapped page ranges, and an ordered list of dirty page ranges.

10. The multiple physical function non-volatile memory device of claim 8, further configured to:
receive a third request, at the migration controller for a device internal state of the child physical function; and
responsive to receiving the third request, provide the device internal state of the child physical function.

11. The multiple physical function non-volatile memory device of claim 8, further configured to:
receive a third request, at the migration controller, to restore a device internal state of the child physical function; and
responsive to receiving the third request, restore the device internal state of the child physical function.

12. The multiple physical function non-volatile memory device of claim 8, wherein the parent physical function is inaccessible to the plurality of host computing devices for security reasons.

13. The multiple physical function non-volatile memory device of claim 8, wherein the child physical function is configured with the subset of functionality by the parent physical function.

14. A computer-implemented method, comprising:
designating a child physical function of a multiple physical function non-volatile memory device as a migration controller, wherein the child physical function implements a subset of functionality provided via a parent physical function to limit data access for a plurality of host computing devices;
providing a first request to the migration controller, the first request to track changes to a namespace made by a virtual machine in one or more data structures;
providing a second request to the migration controller, the second request for the one or more data structures that include the changes to the namespace made by the virtual machine;
receiving, based at least in part on the second request, the one or more data structures from the migration controller;
identifying, based on the one or more data structures, data changed by the virtual machine in the namespace;
providing a third request to the migration controller, the third request for the data changed by the virtual machine in the namespace; and
causing the data changed by the virtual machine in the namespace to be written to another namespace on another multiple physical function non-volatile memory device.

15. The computer-implemented method of claim 14, further comprising:
providing a fourth request to the migration controller, the fourth request for a device internal state of the child physical function;
receiving the device internal state from the migration controller; and
causing the device internal state to be restored to another child physical function on the other multiple physical function non-volatile memory device.

16. The computer-implemented method of claim 14, wherein the one or more data structures are selected from the group consisting of a bitmap of mapped pages, a bitmap of dirty pages, an ordered list of mapped page ranges, and an ordered list of dirty page ranges.

17. The computer-implemented method of claim 14, wherein the parent physical function is inaccessible to the plurality of host computing devices for security reasons.

18. The computer-implemented method of claim 14, wherein the child physical function is configured with the subset of functionality by the parent physical function.

* * * * *